United States Patent
McIsaac et al.

(10) Patent No.: US 7,193,162 B2
(45) Date of Patent: Mar. 20, 2007

(54) METHOD FOR ASSESSING THE OPERATION OF A CONVEYING APPARATUS

(75) Inventors: Stephen McIsaac, Moncton (CA); Ronald William Glowe, Longueuil (CA)

(73) Assignee: Glowe Consulting Services Inc., Longueuil (*) Notice: Subject to any disclaimer, the term of this patent is extended or adjusted under 35 U.S.C. 154(b) by 10 days.

(21) Appl. No.: 10/798,257

(22) Filed: Mar. 12, 2004

(65) Prior Publication Data

US 2005/0261872 A1  Nov. 24, 2005

(51) Int. Cl.
*G01G 11/16* (2006.01)

(52) U.S. Cl. .............................. 177/1; 177/16; 177/50; 73/1.15; 702/101

(58) Field of Classification Search .................... 177/1, 177/16, 50; 73/1.13, 1.15; 702/101, 102
See application file for complete search history.

(56) References Cited

U.S. PATENT DOCUMENTS

| | | | | |
|---|---|---|---|---|
| 1,777,670 A | * | 10/1930 | Sidney | 222/55 |
| 2,758,830 A | * | 8/1956 | Mulock | 177/3 |
| 3,036,769 A | * | 5/1962 | Goslin et al. | 702/175 |
| 3,636,750 A | * | 1/1972 | Wojcik | 73/1.13 |
| 3,722,660 A | * | 3/1973 | Snead | 177/16 |
| 3,942,625 A | * | 3/1976 | Snead | 198/810.01 |
| 4,623,029 A | * | 11/1986 | Bambauer et al. | 177/137 |
| 4,762,252 A | * | 8/1988 | Hyer et al. | 222/56 |
| 4,788,930 A | * | 12/1988 | Matteau et al. | 177/16 |
| 4,796,212 A | * | 1/1989 | Kitagawa | 702/101 |
| 4,914,611 A | * | 4/1990 | Yamanaka et al. | 702/88 |
| 5,393,939 A | * | 2/1995 | Nasuta et al. | 177/145 |
| 5,959,257 A | * | 9/1999 | Campbell et al. | 177/16 |
| 5,994,650 A | * | 11/1999 | Eriksson et al. | 177/45 |
| 6,313,414 B1 | * | 11/2001 | Campbell | 177/16 |
| 6,317,656 B1 | * | 11/2001 | Kira | 700/282 |
| 6,552,279 B1 | * | 4/2003 | Lueschow et al. | 177/141 |

OTHER PUBLICATIONS

"Standard Deviation" By Robert Niles, RobertNiles.com (http://www.robertniles.com/stats/stdev/shtml) Copyright 2006.*
"Standard Deviation" From Wikipedia, the free encyclopedia (http://en.wikipedia.org/wiki/Standard_deviation), Wikimeda Foundation, Inc. May 11, 2006.*

* cited by examiner

*Primary Examiner*—Randy W. Gibsion

(57) ABSTRACT

The present invention is directed to an apparatus and method for measuring the weight of material such as rock, earth, wood, pulp, grain, gravel, sand, ore, cement etc. being processed or moved by an apparatus such as a conveyor, apron conveyor or bucket elevator driven by an electrical motor. The apparatus measures the electrical energy consumed by the motor powering the apparatus during operation of the apparatus and uses a calibration formula derived from an average of no-load readings plus up to 2.0 standard deviations for converting the power consumption of the motor to tonnage per hour of raw material processed by the apparatus. A continual record is kept of all "No-load" and "start-up load" time during the recording process and these figures are totalized along with tonnage for the recording period.

16 Claims, 34 Drawing Sheets

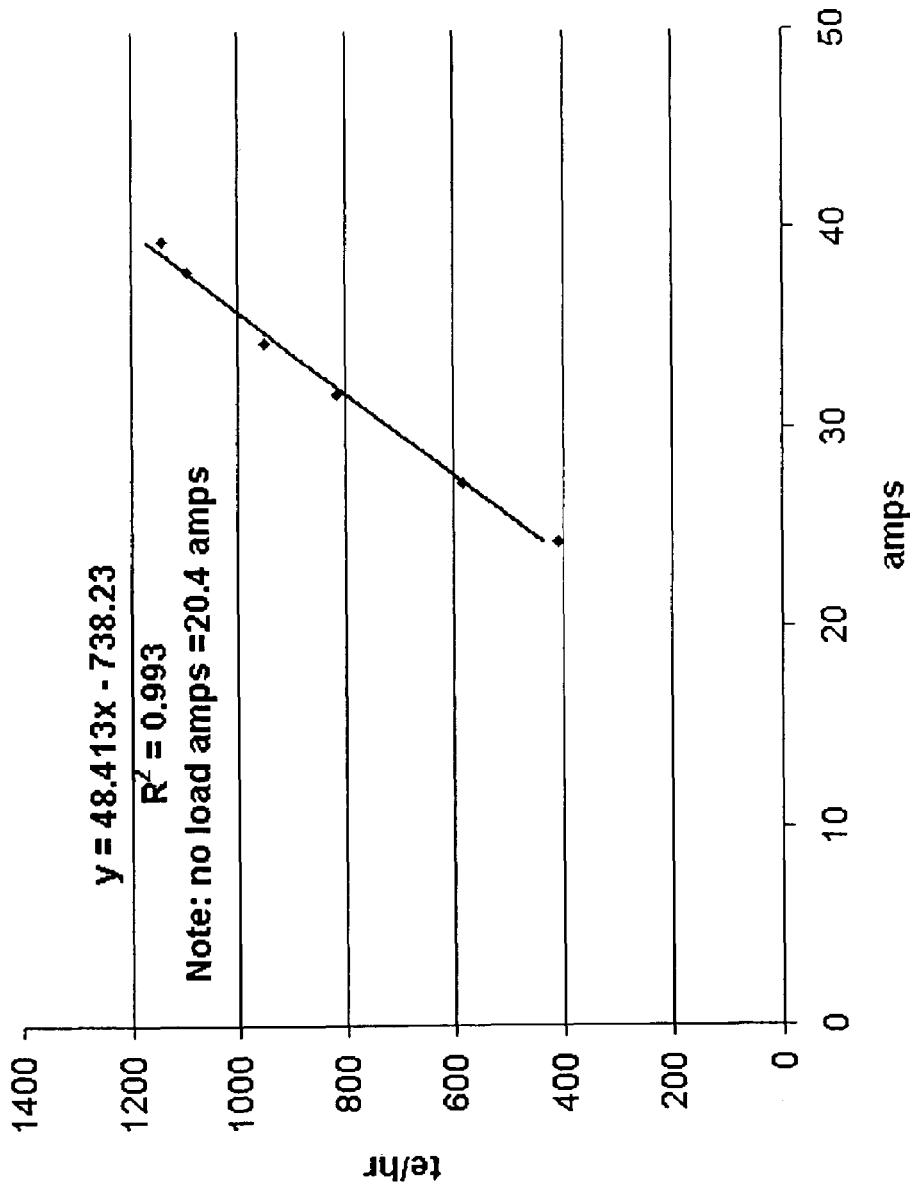

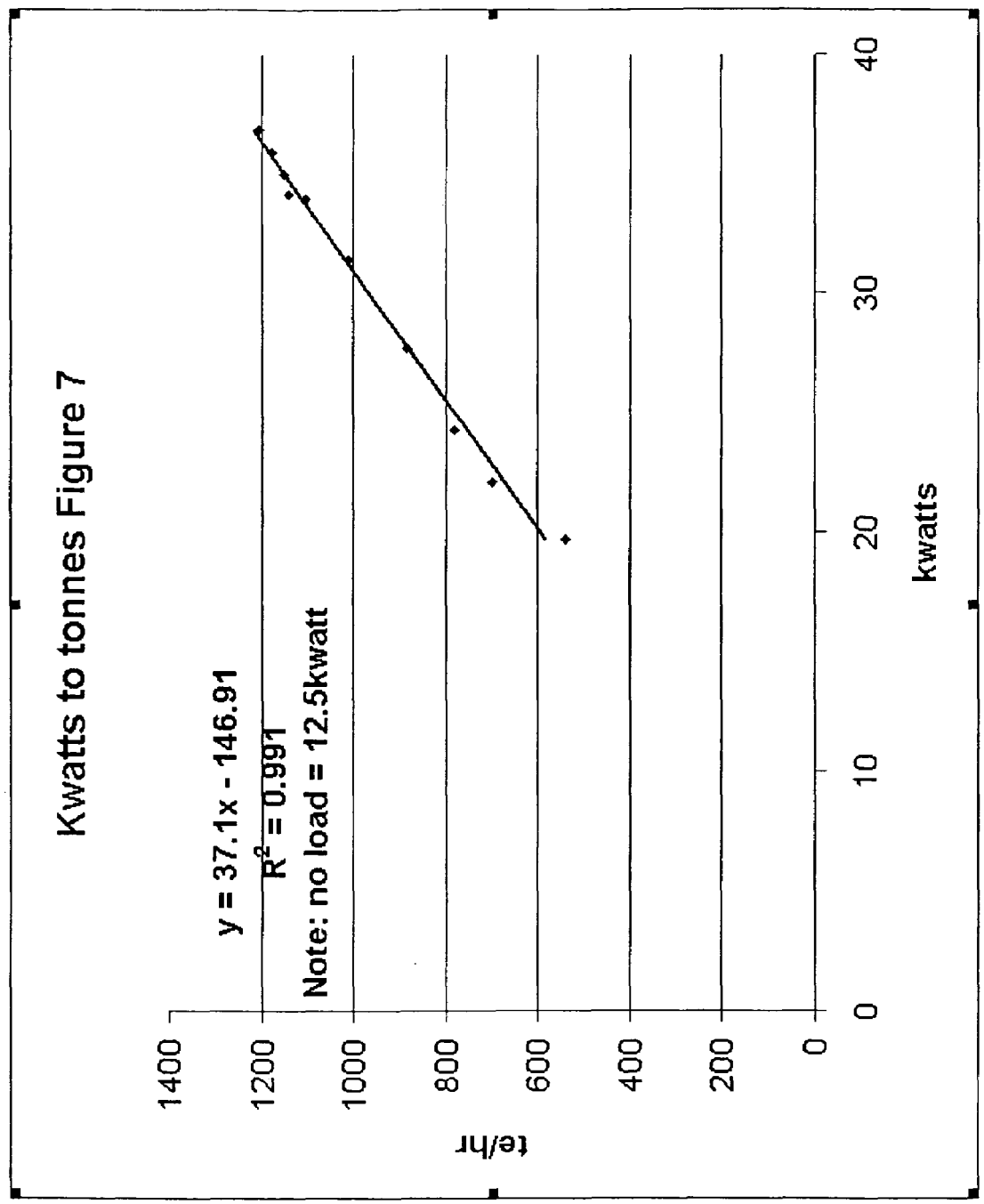

FIGURE: 8

Summary of Tonnage for Typical Conveyor using kwatts to tonnes

| Date | Truck Count | actual Belt Scale tonnes | Corrected Belt Scale tonnes | kwatts conversion to tonnes | difference tonnes | amps conversion to tonnes | difference tonnes |
|---|---|---|---|---|---|---|---|
| April 15,02 | 126 | 6474.10 | 6474.10 | 6470.914 | 3.19 | 0 | 0 |
| April 16,02 | 185 | 9552.40 | 9552.40 | 9404.079 | 148.32 | 9676.29 | -123.89 |
| April 17,02 | 145 | 7730.90 | 7730.90 | 7499.33 | 231.57 | 7753.309 | -22.41 |
| April 18,02 | 180 | 9451.50 | 9539.50 | 9412.356 | 127.14 | 9638.428 | -98.93 |
| April 19,02 | 166 | 8560.00 | 8665.00 | 8553.628 | 111.37 | 8737.455 | -72.45 |
| April 22,02 | 173 | 9138.00 | 9386.15 | 9447.105 | -60.96 | 9465.383 | -79.24 |
| April 23,02 | 197 | 10453.00 | 10692.49 | 10717.322 | -24.84 | 10323.369 | 369.12 |
| April 24,02 | 159 | 7982.00 | 7982.00 | 8125.574 | -143.57 | | |
| April 25,02 | 163 | 3705.00 | 3738.90 | 3773.876 | -34.98 | | |
| April 26,02 | 164 | 8537.00 | 8757.00 | 8933.782 | -176.78 | | |
| April 29,02 | 149 | 8150.00 | 8346.70 | 8418.175 | -71.47 | | |
| April 30,02 | 156 | 8272.00 | 8482.00 | 8504.899 | -22.90 | | |
| May 1,02 | 191 | 9901.00 | 10123.00 | 10138.142 | -15.14 | | |
| May 2,02 | | 10552.90 | 10758.00 | 10777.447 | -19.45 | | |
| TOTAL | | 118459.80 | 120228.13 | 120176.629 | 51.50 | | |

NOTE: Belt Scale tonnage was corrected for tonnage being added from April 18 to April 24th
then taking off tonnage due to removal of rock end April 24 which had fallen on belt scale
NOTE: Apr 24 to May 2 scale was taking tonnes from scale display at 15 to 25 te/hr
NOTE: kwatt calibration formula used as per graph is 37.1x -146.91 for all readings April 15 to May 2
NOTE: Amp calibration formula used as per graph is 48.413x-738.13 for all readings

FIGURE 8b

Comparison Table showing difference in GLOWE-TECH Analyzer Readings with Milltronics Belt Scale Readings

| Date | Operating Time hours | No-Load time hours | Start-Up time hours | Production time-hours | Milltronics tonnes | GT Analyzer tonnes | Difference tonnes | difference % |
|---|---|---|---|---|---|---|---|---|
| 06-May-02 | 7.367 | 1.813 | 0.064 | 5.490 | 2830.000 | 2769.730 | 60.270 | 2.13 |
| 07-May-02 | 10.930 | 2.176 | 0.196 | 8.558 | 4374.000 | 4377.165 | -3.165 | -0.07 |
| 08-May-02 | 7.117 | 1.796 | 0.027 | 5.294 | 2791.000 | 2776.820 | 14.180 | 0.51 |
| 09-May-02 | 6.830 | 1.187 | 0.116 | 5.527 | 3119.500 | 3096.503 | 22.997 | 0.74 |
| 10-May-02 | 10.650 | 1.242 | 0.044 | 9.364 | 4494.000 | 4531.777 | -37.777 | -0.84 |
| 13-May-02 | 10.430 | 7.158 | 0.007 | 3.265 | 1845.900 | 1888.235 | -42.335 | -2.29 |
| 14-May-02 | 8.817 | 5.402 | 0.031 | 3.384 | 1866.000 | 1866.000 | 0.000 | 0.00 |
| 15-May-02 | 10.867 | 1.502 | 0.080 | 9.285 | 4659.000 | 4680.243 | -21.243 | -0.46 |
| 16-May-02 | 11.033 | 2.380 | 0.011 | 8.642 | 4563.000 | 4582.861 | -19.861 | -0.44 |
| 17-May-02 | 9.067 | 1.620 | 0.009 | 7.438 | 3799.000 | 3761.421 | 37.579 | 0.99 |
| 20-May-02 | 8.967 | 1.389 | 0.009 | 7.569 | 3792.000 | 3791.384 | 0.616 | 0.02 |
| 21-May-02 | 10.883 | 1.778 | 0.009 | 9.096 | 4226.000 | 4199.993 | 26.007 | 0.62 |
| 22-May-02 | 10.750 | 1.620 | 0.138 | 8.992 | 3925.000 | 3921.740 | 3.260 | 0.08 |
| 23-May-02 | 7.880 | 1.311 | 0.009 | 6.560 | 3261.000 | 3206.395 | 54.605 | 1.67 |
| TOTAL | | | | | 49545.400 | 49450.267 | 95.133 | |

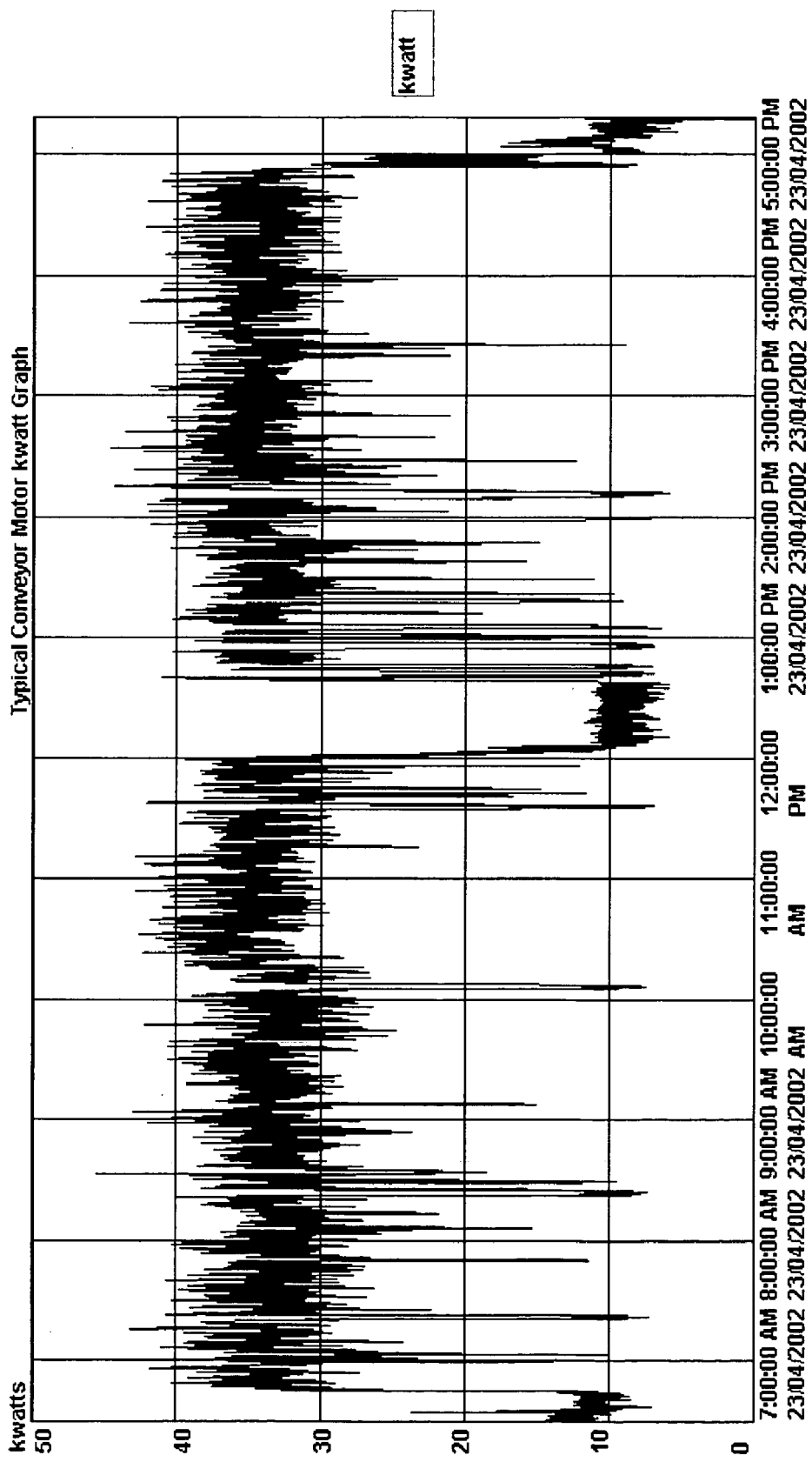
FIGURE: 9 kilowatt graph

FIGURE 10

TYPICAL Quarry Kwatts Converted to Tonnage Summary report

| | | |
|---|---|---|
| Temperature am | 10.000 | Degrees Celcius |
| Temperature pm | 17.000 | Degrees Celcius |
| No load kwatt = | 13.600 | |
| Start up kwatts = | 21.000 | |
| Time No-Load kwatt | 134.533 minutes | 2.242 hours |
| Time Start-Up kwatts | 1.067 minutes | 0.018 hours |
| Total Production time | 11.676 hours | 9.434 hours |
| Average kwatt for day | | 17.308 kwatts |
| Average Tonnage by formula | | 555.233 te/hr |
| Actual Scale Reading | | 5263.000 tonnes |
| Total tonnage by GT analyzer = | | 5237.943 tonnes | 5237.696 tonnes totalized |
| difference | | -25.057 | -25.3040 tonnes |

| Time of data Reading | Actual Kwatt Reading | Count No-Load | Count Over-load | Conditioned kwatt | tonnes/hour on conveyor | Tons/hr on conveyor |
|---|---|---|---|---|---|---|
| 28/02/2003 6:00:05 | 0.1464615 | 1 | | 0 | | |
| 28/02/2003 6:00:13 | 0.1708718 | 1 | | 0 | | |
| 28/02/2003 6:00:21 | 0.1464615 | 1 | | 0 | | |
| Break | | | | | | |
| 28/02/2003 17:39:17 | 17.45333 | | 0 | 17.453 | 564.102 | 1.254 |
| 28/02/2003 17:39:25 | 17.89272 | | 0 | 17.893 | 590.888 | 1.313 |
| 28/02/2003 17:39:33 | 17.25805 | | 0 | 17.258 | 552.198 | 1.227 |
| 28/02/2003 17:39:41 | 17.33128 | | 0 | 17.331 | 556.662 | 1.237 |
| 28/02/2003 17:39:49 | 17.136 | | 0 | 17.136 | 544.758 | 1.211 |
| 28/02/2003 17:39:57 | 15.57374 | | 0 | 15.574 | 449.521 | 0.999 |
| 28/02/2003 17:40:05 | 14.7682 | | 0 | 14.768 | 400.414 | 0.890 |
| 28/02/2003 17:40:13 | 14.42646 | | 0 | 14.426 | 379.581 | 0.844 |
| 28/02/2003 17:40:21 | 13.66974 | | 1 | 13.670 | 333.451 | 0.741 |
| 28/02/2003 17:40:29 | 13.03508 | | 0 | | | |

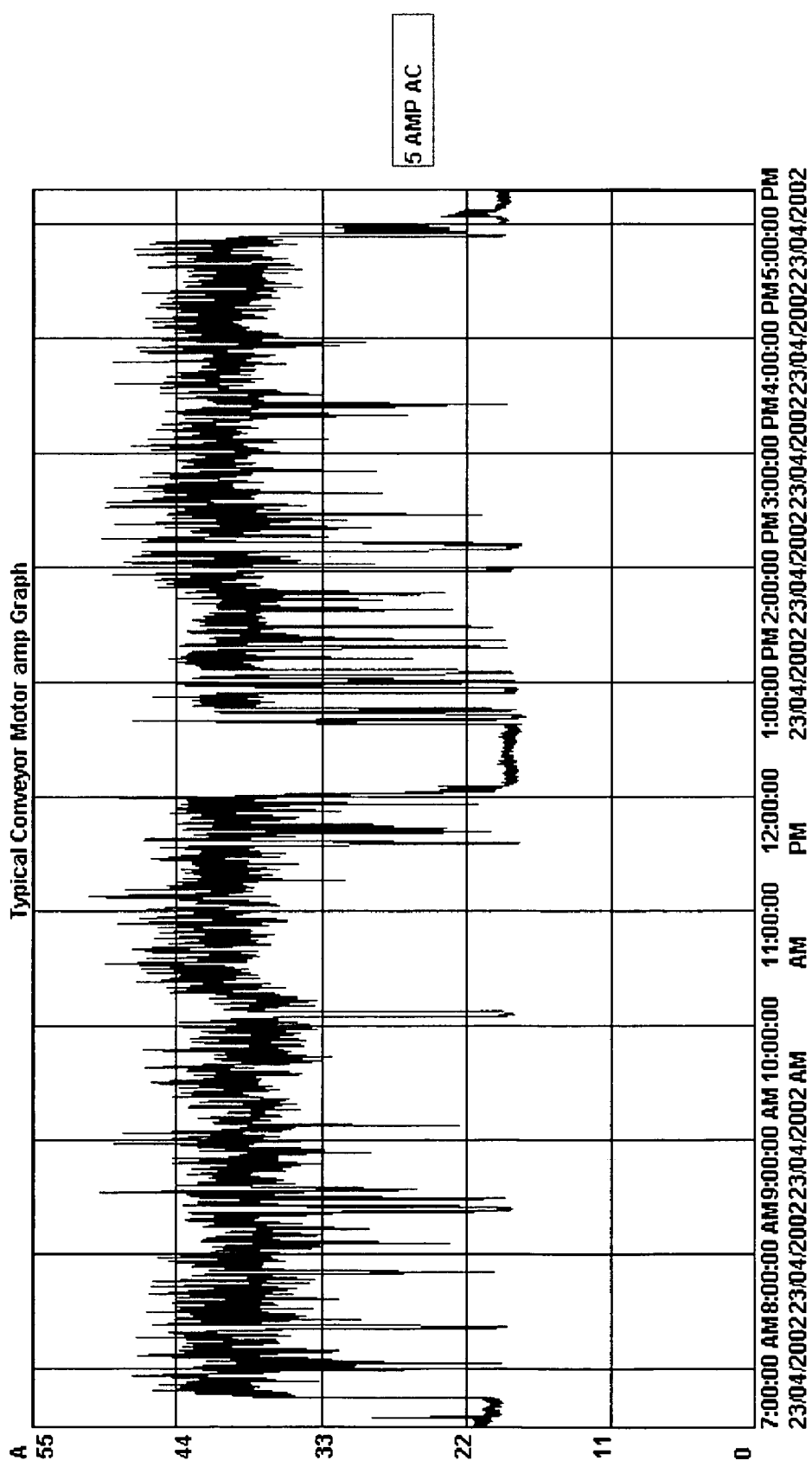
FIGURE: 11 ampere Graph

TYPICAL Quarry Amps to tonnage Summary Feb 12, 2003

FIGURE 12

| | | |
|---|---|---|
| Temperature | am | 9.000 degrees C |
| Temperature | pm | 15.000 degrees C |

| | | |
|---|---|---|
| No load current = | 25.000 | |
| Start up current = | 80.000 | |

| | | |
|---|---|---|
| Time no load amps | 69.33 minutes | 1.156 hours |
| Time at start-up amps | 5.87 minutes | 0.098 hours |
| Total Recording Time | 11.709 hours | |
| Average current for day = | 66.787 | 10.553 total hr production amps |
| Average Tonnage by formula = | | 496.592 tonnes |
| Total tonnes by Instrument | | 5240.756 tonnes |
| Total tonnes by scale | | 5184.000 tonnes |
| Difference | | −56.756 tonnes |

5240.7003 tonnes totalized
−56.700 tonnes

| Time of reading | Actual Amps | Count no load | Count > startup Amps | Conditioned Amps | Tons/ hour on conveyor | Tons/hr on conveyor |
|---|---|---|---|---|---|---|
| 12/02/2003 6:00:04 | 20.30774 | 1 | 0 | | | |
| 12/02/2003 6:00:12 | 20.26378 | 1 | 0 | | | |
| 12/02/2003 6:00:20 | 20.26378 | 1 | 0 | | | |
| BREAK | | | | | | |
| 12/02/2003 17:41:00 | 60.22648 | 0 | 0 | 60.226 | 428.974 | 0.9533 |
| 12/02/2003 17:41:08 | 59.25929 | 0 | 0 | 59.259 | 419.006 | 0.9311 |
| 12/02/2003 17:41:16 | 60.71008 | 0 | 0 | 60.710 | 433.959 | 0.9644 |
| 12/02/2003 17:41:24 | 60.00667 | 0 | 0 | 60.007 | 426.709 | 0.9482 |
| 12/02/2003 17:41:32 | 56.31374 | 0 | 0 | 56.314 | 388.646 | 0.8637 |
| 12/02/2003 17:41:40 | 52.79667 | 0 | 0 | 52.797 | 352.395 | 0.7831 |
| 12/02/2003 17:41:48 | 46.77369 | 0 | 0 | 46.774 | 290.316 | 0.6451 |
| 12/02/2003 17:41:56 | 42.99284 | 0 | 0 | 42.993 | 251.347 | 0.5585 |
| 12/02/2003 17:42:04 | 37.45346 | 0 | 0 | 37.453 | 194.253 | 0.4317 |
| 12/02/2003 17:42:12 | 32.52956 | 0 | 0 | 32.530 | 143.502 | 0.3189 |
| 12/02/2003 17:42:20 | 27.60566 | 0 | 0 | 27.606 | 92.752 | 0.2061 |
| 12/02/2003 17:42:28 | 24.57219 | 0 | 1 | | | |

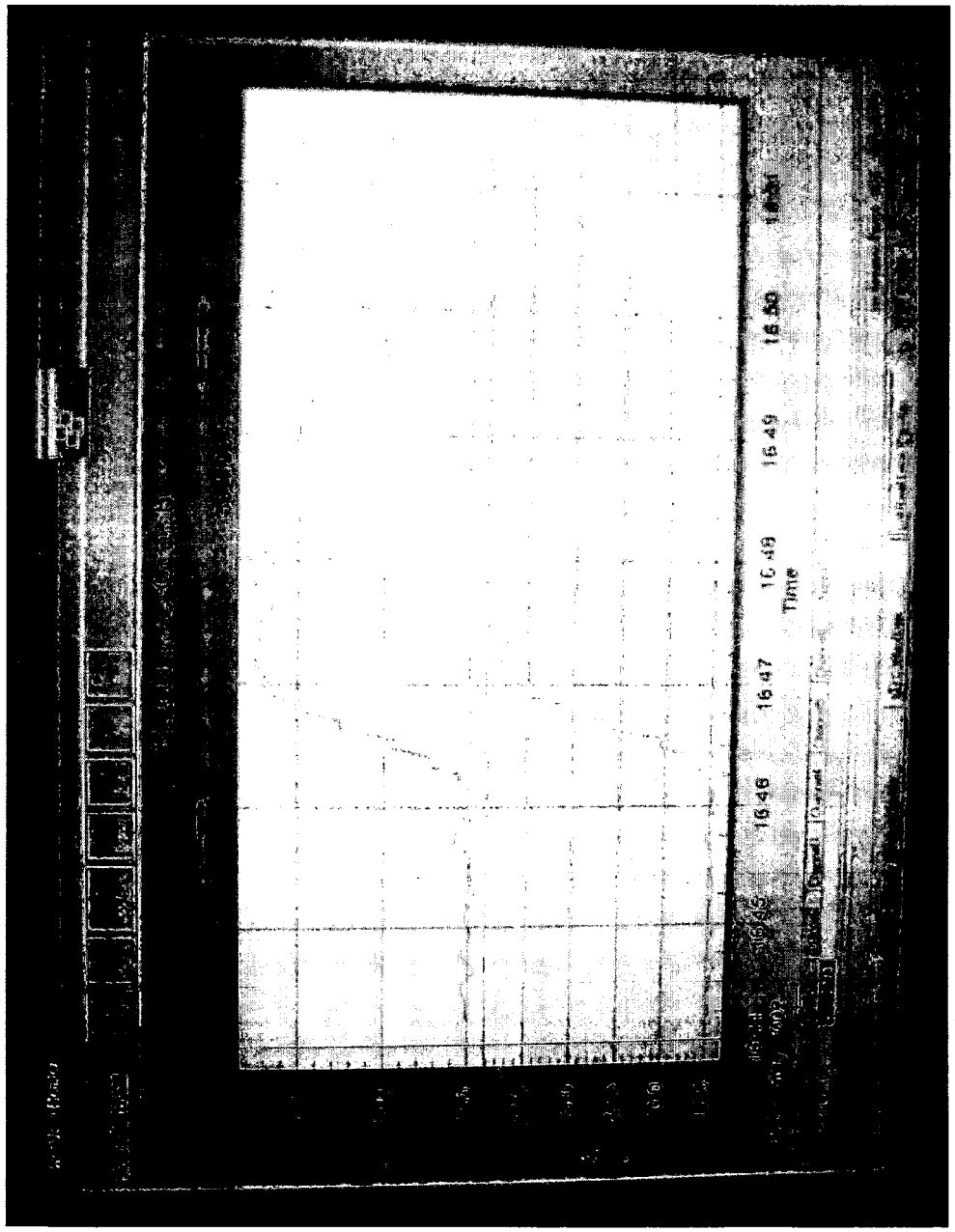
FIGURE 13a: - Typical Real Time Graph showing te/hr converted from Watt Transducer and a Real Time Graph of Amperage readings from the same Conveyor motor for parallel conversion to Tonnage for demonstration purposes.

| | A | B | C | D | E | F | G | H | I | J | K |
|---|---|---|---|---|---|---|---|---|---|---|---|
| 1 | Typical Daily conversion kilowatts to tonnes Aug 5, 2003 | | | | | | | | | | |
| 2 | | | | | | | | | | | |
| 3 | | | | | | | Calibration Formulas | | | | |
| 4 | | No load kwatt | | Motor | 7.403 kwatts | | 655.406 Ideal Formula Number | | | | |
| 5 | | Peak kwatts | | | 33.800 kwatts | | 590.903 01/08/2018, formula 1 | | | | |
| 6 | Time No-Load kwatt | | | minutes | 0.178 heures | | 631.737 01/09/2015, formula 2 | | | | |
| 7 | Time Start-Up kwatts | | | minutes | 0.000 heures | | 652.916 Jun 20,03, Formula 3 | currently used | | | |
| 8 | Total Production time | | 3.536 hours | | 3.358 heures | | | | | | |
| 9 | Average kwatt for day | | | Motor | kwatts | | | | | | |
| 10 | Average Tonnage by formula | | | | 649.772 te/hre | | No-Load Original reading | | 7.300 kwatts | | |
| 11 | | | | | | | New No-load reading | | 7.403 kwatts | | |
| 12 | Tonnage by belt scale | | | | 2201.000 tonnes est | | 649.772 New Formula | | -0.103 kwatts difference | | |
| 13 | Total tonnage by GT analyzer = | | | | 2182.077 tonnes | | | | | | |
| 14 | Difference | | | | 18.923 tonnes | | | tonnes based on original formula | | | |
| 15 | Percentage difference | | | | 0.860 % | | 8.655 tonnes difference | | | | |
| | | | | | | | 0.393 % | | | | |
| | Time of data | Actual Kwatt | Count | Count | Conditioned | tonnes/hr on | te/hr | | No-Load | | |
| 16 | Reading | Reading | No-Load | Peak-load | kwatt | conveyor | totalized | No-Load Time | Reading | | |
| 17 | 05/08/2003 6:16:26 | -0.07618 | 1 | 0 | | | | 05/08/2003 7:19:22 | 7.03132 | | 6.965 Average kw |
| 18 | 05/08/2003 6:16:34 | 10.84231 | 0 | 0 | 10.842 | 179.824 | 0.400 | 05/08/2003 7:19:30 | 7.12659 | | 0.293 Std dev |
| 19 | 05/08/2003 6:16:42 | 12.55725 | 0 | 0 | 12.557 | 231.932 | 0.515 | 05/08/2003 7:19:38 | 7.62202 | | 7.403 1.5 std dev |
| 20 | 05/08/2003 6:16:50 | 14.48160 | 0 | 0 | 14.482 | 290.409 | 0.645 | 05/08/2003 7:19:46 | 6.95510 | | 7.550 2.0 std dev |
| 21 | 05/08/2003 6:16:58 | 17.18760 | 0 | 0 | 17.188 | 372.625 | 0.828 | 05/08/2003 7:19:54 | 6.95510 | | |
| 22 | 05/08/2003 6:17:06 | 20.75088 | 0 | 0 | 20.751 | 480.895 | 1.069 | 05/08/2003 7:20:02 | 7.16470 | | |
| 23 | 05/08/2003 6:17:14 | 25.01919 | 0 | 0 | 25.019 | 610.588 | 1.357 | 05/08/2003 7:20:10 | 7.06943 | | |
| 1593 | 05/08/2003 9:46:34 | 29.17316 | 0 | 0 | 29.173 | 736.806 | 1.637 | | | | |
| 1594 | 05/08/2003 9:46:42 | 29.02073 | 0 | 0 | 29.021 | 732.175 | 1.627 | | | | |
| 1595 | 05/08/2003 9:46:50 | 28.52530 | 0 | 0 | 28.525 | 717.121 | 1.594 | | | | |
| 1596 | 05/08/2003 9:46:58 | 28.54435 | 0 | 0 | 28.544 | 717.700 | 1.595 | | | | |
| 1597 | 05/08/2003 9:47:06 | 30.27835 | 0 | 0 | 30.278 | 770.388 | 1.712 | | | | |
| 1598 | 05/08/2003 9:47:14 | 29.34466 | 0 | 0 | 29.345 | 742.017 | 1.649 | | | | |
| 1599 | 05/08/2003 9:47:22 | 30.41174 | 0 | 0 | 30.412 | 774.441 | 1.721 | | | | |
| 1600 | 05/08/2003 9:47:30 | 29.49710 | 0 | 0 | 29.497 | 746.649 | 1.659 | | | | |
| 1601 | 05/08/2003 9:47:38 | 28.08703 | 0 | 0 | 28.087 | 703.804 | 1.564 | | | | |
| 1602 | 05/08/2003 9:47:46 | 29.36371 | 0 | 0 | 29.364 | 742.596 | 1.650 | | | | |
| 1603 | 05/08/2003 9:47:54 | 29.30655 | 0 | 0 | 29.307 | 740.860 | 1.646 | | | | |
| 1604 | 05/08/2003 9:48:02 | 29.11600 | 0 | 0 | 29.116 | 735.070 | 1.633 | | | | |
| 1605 | 05/08/2003 9:48:10 | 29.19222 | 0 | 0 | 29.192 | 737.386 | 1.639 | | | | |
| 1606 | 05/08/2003 9:48:18 | 29.00167 | 0 | 0 | 29.002 | 731.596 | 1.626 | | | | |
| 1607 | 05/08/2003 9:48:26 | 29.38277 | 0 | 1 | 29.383 | 743.175 | 1.652 | | | | |
| 1608 | | | | 0 | | | | | | | |

Figure 13b Typical Daily Summary Table with Stable No-Load reading

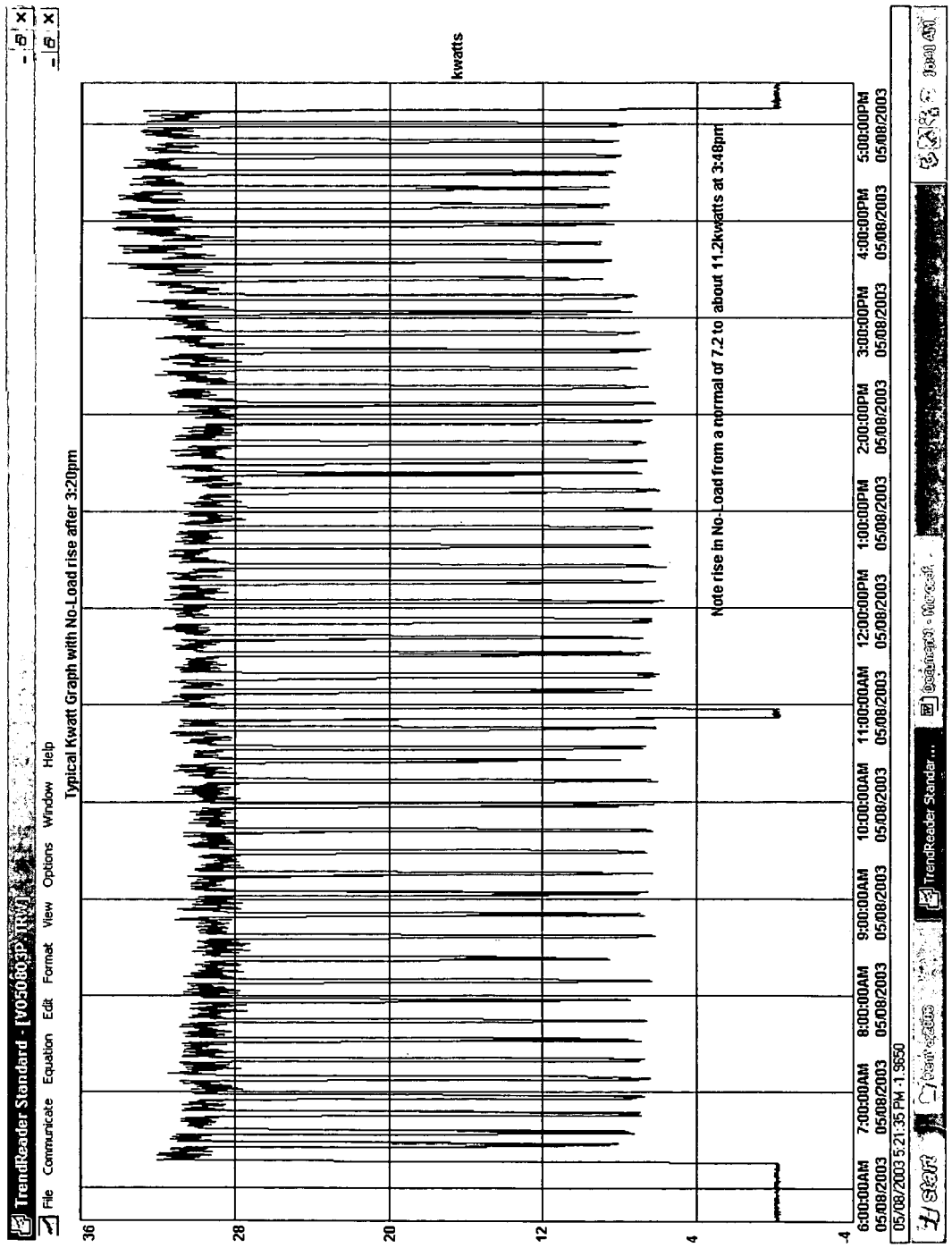
FIGURE 13d Typical Kilowatt Graph showing effect of change in No-Load caused by Friction on return side of Conveyor

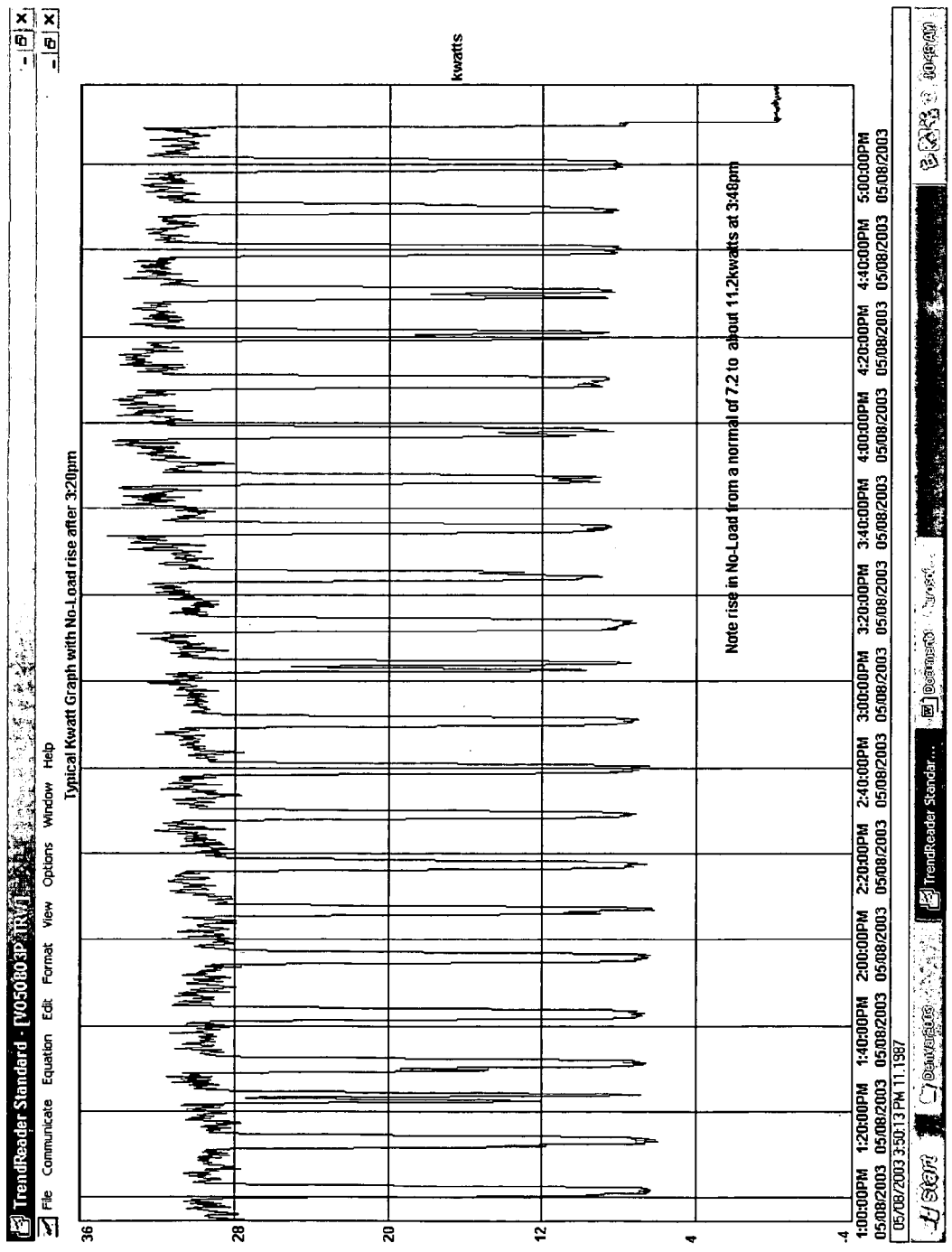
Figure 13e Enlarged view of change in No-Load readings caused by friction on Return Conveyor belt Figure 13f Typical Daily summary with No-Load Adjustment

| | A | B | C | D | E | F | G | H | I | J |
|---|---|---|---|---|---|---|---|---|---|---|
| 1 | Figure 13f Typical Daily summary with No-Load Adjustment | | | | | | | | | |
| 2 | | | | | | | Calibration Formulas | | | |
| 3 | | | | | | | 601.908 | Ideal Formula Number | | |
| 4 | | | | | | | 639.613 | Aug-18 | | |
| 5 | | No load kwatt | | Motor | 10.834 | kwatts | 683.630 | Sep-15 | | |
| | | Peak kwatts | | | 35.000 | kwatts | 706.915 | Jun 20.03 | currently used | |
| 6 | Time No-Load kwatt | | 97.867 | minutes | 1.631 | heures | | | | |
| 7 | Time Start-Up kwatts | | 0.000 | minutes | 0.000 | heures | | | | |
| 8 | Total Production time | | 10.89 | hours | 9.259 | heures | | | | |
| 9 | Average kwatt for day | | | Motor | 28.189 | kwatts | No-Load Original reading | | 7.300 | kwatts |
| 10 | Average Tonnage by formula | | | | 599.534 | te/hre | New No-load reading | | 10.834 | kwatts |
| 11 | | | | | | | 599.534 | New Formula | -3.534 | kwatts difference |
| 12 | Tonnage by belt scale | | | | 5573.000 | tonnes est | | | | |
| 13 | Total tonnage by GT analyzer = | | | | 5551.023 | tonnes | 6574.309 | tonnes based on original formula | | |
| 14 | Difference | | | | 21.977 | tonnes | -1001.309 | tonnes difference | | |
| 15 | Percentage difference | | | | 0.394 | % | -17.967 | % | | |
| | Time of data | Actual Kwatt | Count | Count | Conditioned | tonnes/hr on | te/hr | | No-Load | |
| 16 | Reading | Reading | No-Load | Peak-load | kwatt | conveyor | totalized | No-Load Time | Reading | |
| 17 | 05/08/2003 6:16:26 | -0.07618 | 1 | 0 | | | | 05/08/2003 15:46:18 | 9.22264 | 9.711 Average kw |
| 18 | 05/08/2003 6:16:34 | 10.84231 | 0 | 0 | 10.842 | 179.824 | 0.400 | 05/08/2003 15:46:26 | 9.08925 | 0.740 Std dev |
| 19 | 05/08/2003 6:16:42 | 12.55725 | 0 | 0 | 12.557 | 231.932 | 0.515 | 05/08/2003 15:46:34 | 9.41319 | 10.834 1.5 std dev |
| 20 | 05/08/2003 6:16:50 | 14.48180 | 0 | 0 | 14.482 | 290.409 | 0.645 | 05/08/2003 15:46:42 | 10.15633 | 11.208 2.0 std dev |
| 21 | 05/08/2003 6:16:58 | 17.18760 | 0 | 0 | 17.188 | 372.625 | 0.828 | 05/08/2003 15:46:50 | 11.26152 | |
| 4905 | 05/08/2003 17:08:10 | 32.73644 | 0 | 0 | 32.736 | 845.077 | 1.878 | | | |
| 4906 | 05/08/2003 17:08:18 | 32.06952 | 0 | 0 | 32.070 | 824.812 | 1.833 | | | |
| 4907 | 05/08/2003 17:08:26 | 32.83171 | 0 | 0 | 32.832 | 847.972 | 1.884 | | | |
| 4908 | 05/08/2003 17:08:34 | 29.09694 | 0 | 0 | 29.097 | 734.491 | 1.632 | | | |
| 4909 | 05/08/2003 17:08:42 | 26.23870 | 0 | 0 | 26.239 | 647.643 | 1.439 | | | |
| 4910 | 05/08/2003 17:08:50 | 22.02756 | 0 | 0 | 22.028 | 519.697 | 1.155 | | | |
| 4911 | 05/08/2003 17:08:58 | 15.75848 | 0 | 0 | 15.758 | 329.201 | 0.732 | | | |
| 4912 | 05/08/2003 17:09:06 | 11.45207 | 0 | 0 | 11.452 | 198.351 | 0.441 | | | |
| 4913 | 05/08/2003 17:09:14 | 7.88879 | 1 | 0 | | | | | | |
| 4914 | 05/08/2003 17:09:22 | 7.75541 | 1 | 0 | | | | | | |
| 4915 | 05/08/2003 17:09:30 | 7.73635 | 1 | 0 | | | | | | |
| 4916 | 05/08/2003 17:09:38 | 8.07934 | 1 | 0 | | | | | | |
| 4917 | 05/08/2003 17:09:46 | 7.66013 | 1 | 0 | | | | | | |
| 4918 | 05/08/2003 17:09:54 | 7.77446 | 1 | 0 | | | | | | |
| 4919 | 05/08/2003 17:10:02 | 0.00004 | 0 | 0 | | | | | | |

Figure 13f Daily Summary Showing Impact of No-Load Adjustment due to dirt build up at 3:20pm

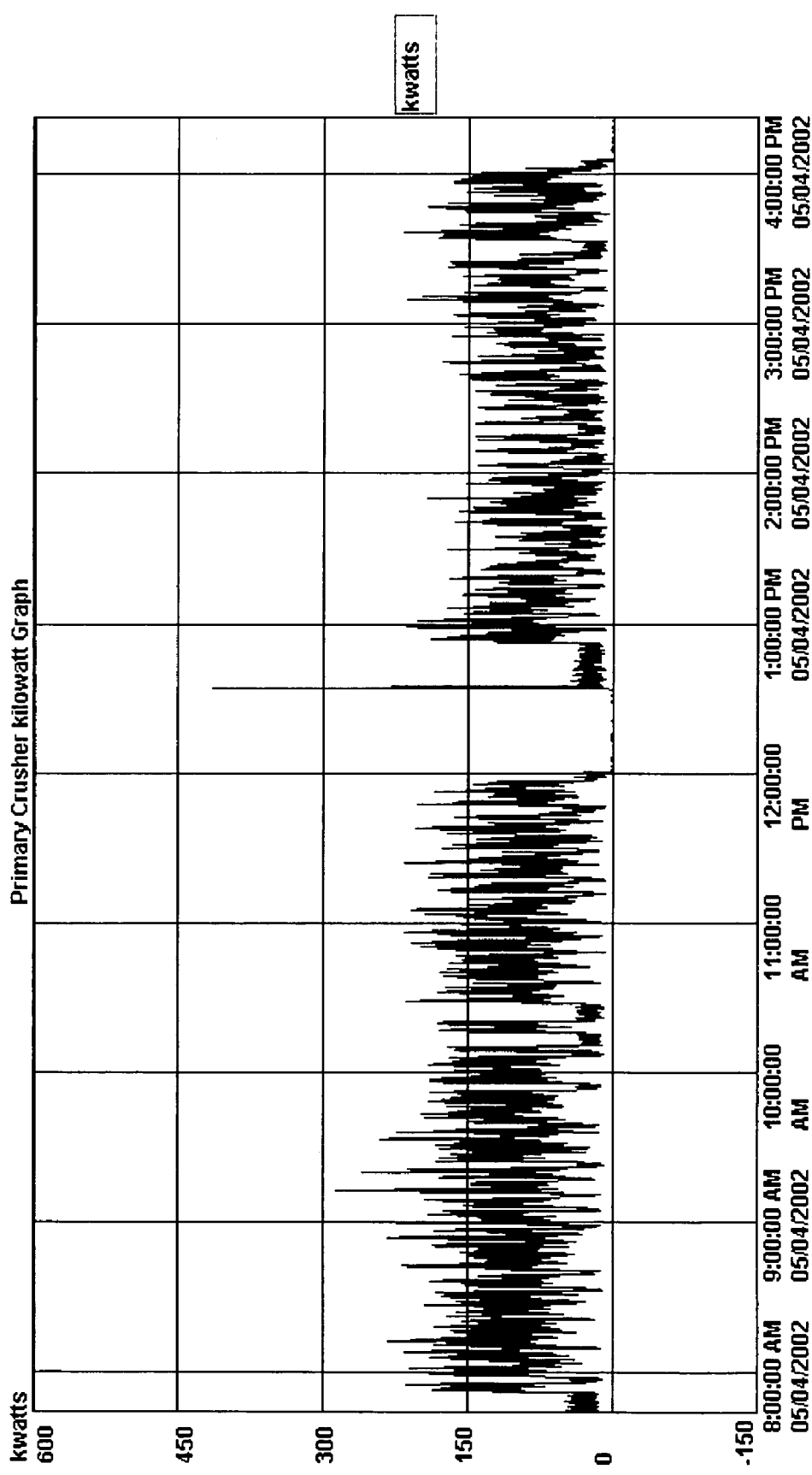
Figure 14: Typical Primary Crusher Graph

FIGURE 15

Typical Primary Crusher kwatt report April 5, 2002

|  |  |  |  |
|---|---|---|---|
| | No load kwatt = | | 30.000 kwatts |
| | Start up kwatts = | | 410.000 kwatts |
| Time No-Load kwatt | | 144.400 minutes | 2.407 hours |
| Time Start-Up kwatts | | 0.133 minutes | 0.002 hours |
| Total production time 10 hrs 23 min | | 10.383 hours | 7.974 hours actual |
| Total tonnes on Primary Conveyor Belt Scale | | | 7713.0 tonnes |
| Average kwatt for day | | | 91.785 |
| Total kwatts crushing | | | 731.906 kwatts |
| Total te/kwatt crushed | | | 10.538 te/kwatt |

| Time of data Reading | Actual Kwatt Reading | Count No-Load | Count Over-load | Conditioned kwatt |
|---|---|---|---|---|
| 05/04/2002 7:24:33 | 0.811 | 1 | 0 | |
| 05/04/2002 7:24:41 | 4.358 | 1 | 0 | |
| 05/04/2002 7:24:49 | 1.520 | 1 | 0 | |
| 05/04/2002 7:24:57 | 0.811 | 1 | 0 | |
| 05/04/2002 7:25:05 | 0.811 | 1 | 0 | |
| 05/04/2002 7:25:13 | 2.027 | 1 | 0 | |
| 05/04/2002 7:25:21 | 2.939 | 1 | 0 | |
| 05/04/2002 7:25:29 | 3.851 | 1 | 0 | |
| 05/04/2002 7:25:37 | 2.230 | 1 | 0 | |
| 05/04/2002 7:25:45 | 3.243 | 1 | 0 | |
| 05/04/2002 7:25:53 | 1.317 | 1 | 0 | |
| 05/04/2002 7:26:01 | 2.331 | 1 | 0 | |
| 05/04/2002 7:26:09 | 2.939 | 1 | 0 | |
| 05/04/2002 7:26:17 | 1.013 | 1 | 0 | |
| 05/04/2002 7:26:25 | 0.811 | 1 | 0 | |
| 05/04/2002 7:26:33 | 1.926 | 1 | 0 | |
| 05/04/2002 7:26:41 | 2.534 | 1 | 0 | |
| 05/04/2002 7:26:49 | 1.115 | 1 | 0 | |
| 05/04/2002 7:26:57 | 0.811 | 1 | 0 | |
| 05/04/2002 7:27:05 | 0.811 | 1 | 0 | |
| 05/04/2002 7:27:13 | 0.811 | 1 | 0 | |
| 05/04/2002 7:27:21 | 0.811 | 1 | 0 | |
| 05/04/2002 7:27:29 | 4.155 | 1 | 0 | |
| 05/04/2002 7:27:37 | 0.709 | 1 | 0 | |
| 05/04/2002 7:27:45 | 0.811 | 1 | 0 | |
| 05/04/2002 7:27:53 | 0.811 | 1 | 0 | |
| 05/04/2002 7:28:01 | 0.709 | 1 | 0 | |
| 05/04/2002 7:28:09 | 0.709 | 1 | 0 | |
| 05/04/2002 7:28:17 | 3.952 | 1 | 0 | |
| 05/04/2002 7:28:25 | 2.736 | 1 | 0 | |
| 05/04/2002 7:28:33 | 0.811 | 1 | 0 | |
| 05/04/2002 7:28:41 | 389.056 | 0 | 0 | 389.056 |
| 05/04/2002 7:28:49 | 53.306 | 0 | 0 | 53.306 |
| 05/04/2002 7:28:57 | 55.739 | 0 | 0 | 55.739 |
| 05/04/2002 7:29:05 | 51.178 | 0 | 0 | 51.178 |
| 05/04/2002 7:29:13 | 41.247 | 0 | 0 | 41.247 |

FIGURE 16

TYPICAL QUARRY Kwatts Tonnage report Apr 3, 2003 With TEMPERATURE Effect

| | | |
|---|---|---|
| Temperature am | -6.800 Degrees Celcius | |
| Temperature pm | -5.700 Degrees Celcius Conversion formula | temperature |
| No load kwatt = | 12.400 | 203.846  Feb-13  -19 |
| Start up kwatts = | 21.000 | 222.018  Jan-30  -15 |
| | | 310.794  Apr-03  -6.5 used |
| Time No-Load kwatt | 10.000 minutes | 0.167 hours |
| Time Start-Up kwatts | 0.000 minutes | 0.000 hours |
| Total Production time | 2.058 hours | 1.891 hours  309.306 ideal |
| Average kwatt for day | | 14.018 kwatts |
| Average Tonnage by formula | | 310.794 te/hr |
| Actual Scale Reading | | 585.000 tonnes |
| Total tonnage by GT analyzer = | | 587.814 tonnes  586.941 tonnes totalized |
| difference | | 2.814 tonnes  1.9410 tonnes |

| Time of data Reading | Actual Kwatt Reading | Count No-Load | Count Over-load | Conditioned kwatt | tonnes/hour on conveyor | Tonnes on conveyor |
|---|---|---|---|---|---|---|
| 03/04/2003 14:07:38 | 14.69497 | 0 | 0 | 14.695 | 361.916 | 0.804 |
| 03/04/2003 14:07:46 | 14.06031 | 0 | 0 | 14.060 | 314.021 | 0.698 |
| 03/04/2003 14:07:54 | 13.37682 | 0 | 0 | 13.377 | 262.442 | 0.583 |

BREAK

| Time of data Reading | Actual Kwatt Reading | Count No-Load | Count Over-load | Conditioned kwatt | tonnes/hour on conveyor | Tonnes on conveyor |
|---|---|---|---|---|---|---|
| 03/04/2003 16:09:46 | 12.8398 | 0 | 0 | 12.840 | 221.916 | 0.493 |
| 03/04/2003 16:09:54 | 12.66892 | 0 | 0 | 12.669 | 209.020 | 0.464 |
| 03/04/2003 16:10:02 | 12.59569 | 0 | 0 | 12.596 | 203.494 | 0.452 |
| 03/04/2003 16:10:10 | 12.86421 | 0 | 0 | 12.864 | 223.758 | 0.497 |
| 03/04/2003 16:10:18 | 12.98626 | 0 | 0 | 12.986 | 232.968 | 0.518 |
| 03/04/2003 16:10:26 | 12.88862 | 0 | 0 | 12.889 | 225.600 | 0.501 |
| 03/04/2003 16:10:34 | 13.0839 | 0 | 0 | 13.084 | 240.337 | 0.534 |
| 03/04/2003 16:10:42 | 13.13272 | 0 | 0 | 13.133 | 244.021 | 0.542 |
| 03/04/2003 16:10:50 | 13.23036 | 0 | 0 | 13.230 | 251.389 | 0.559 |
| 03/04/2003 16:10:58 | 13.25477 | 0 | 0 | 13.255 | 253.231 | 0.563 |

Glowe-Tech Tonnage Analyzer

- Real Time Program showing total tonnage, tph, production time, and No-Load time values

Glowe-Tech Tonnage Analyzer

- Zero test activated as shown in Red

Glowe-Tech Tonnage Analyzer

- Program startup with graphic display of last 20 minutes of data in Real Time.

Glowe-Tech Tonnage Analyzer

- Running with tonnage values totalized and shown as tph, updated every second.

Figure 23 PDA Tonnage Analyzer
- Motor view with kwatt values and a zero test in progress for motors 1, 3, and 6. Zero test will confirm no-load operating conditions and any changes will be automatically incorporated in calibration formula.
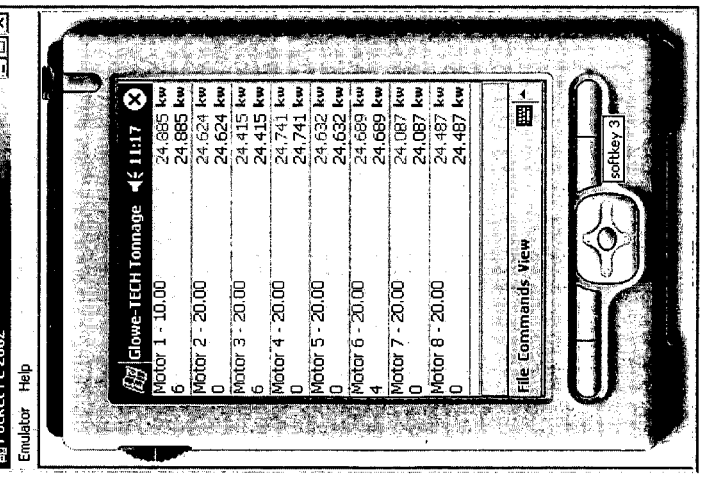

Figure 24 PDA Tonnage Analyzer
- Motor view with kwatt values and finished zero tests with new No-load values for motors 1, 3, and 6. All future tonnage conversions will be based on new No-Load values.
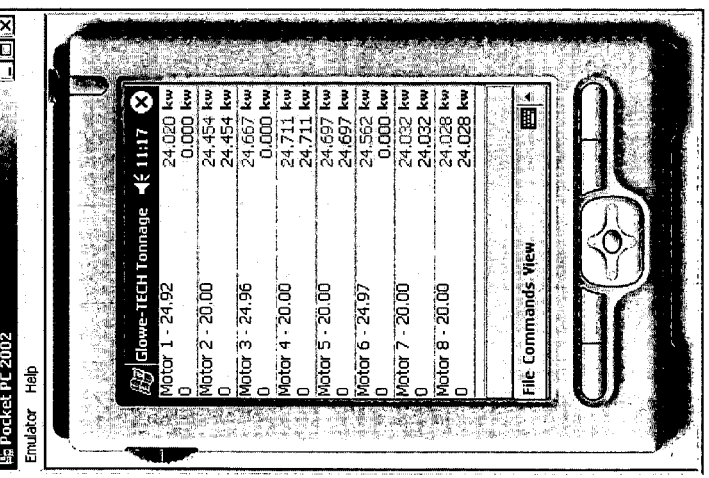

Figure 25 PDA Tonnage Analyzer

- Daily Summary Report including Total tonnage, Production time, No-Load time and new No-load calibration value.

```
110903 124325.txt - Notepad
File  Edit  Format  Help

Start 11/09/03 12:27:28
End   11/09/03 12:43:22

11/09/03

Nom      Te Total     Temps de Production    Temps de Noload    Noload
======   =========    ==================     ================   ========
CV 212   58.26376          00:14:12               00:01:40       24.91902
CV 213   57.84868          00:14:04               00:01:48       24.90978
CV 214   58.58227          00:14:16               00:01:36       24.95023
```

METHOD FOR ASSESSING THE OPERATION OF A CONVEYING APPARATUS

FIELD OF THE INVENTION

The present invention is directed to an apparatus and method for measuring the weight of material, such as rock, sand, gravel, earth, wood, grain, cement, etc., being processed by an apparatus such as a conveyor or bucket elevator system by an electric motor. In particular, the apparatus and method is directed to converting electrical power consumption of the electric motor powering the apparatus into weight per hour movement of raw material processed by the apparatus. The second part of this invention is using the tonnage rate measurements combined with a "no load" time as a new means of assessing daily production at each step in the process. Finally in a quarry or mine site where blasting of rock is used as a first step in breaking down rock for processing it is possible to use these tonnage rate readings if set up at several key steps in the crushing and screening process as a new method to evaluate blast fragmentation results.

BACKGROUND OF THE INVENTION

In many mining, quarrying, sand and gravel or pulp and paper operations it is desirable to measure the amount of raw material, such as aggregate, gravel, ore, pulp etc. being processed or moved, in order to maximize production at the operation. In the past, this has been accomplished either by weighing the amount of material loaded into transport vehicles, such as trucks or railway cars or through the use of auto weigh feeders, belt scales, or load cells all based on the use of strain gauge load cells combined with high speed sensors to measure tonnage. This can be an expensive set up, requiring installation of new equipment, wiring and material testing for calibration for each piece of equipment to be monitored. To maintain accuracy the belt scales or load cells also require regular calibration and zeroing of cells.

In Automation Control the Belt Scale is the most widely used device to measure weight of material movement however these devices are installed as separate equipment on a conveying device. One example of such an apparatus, is the Siemens Miltronics MSI Single Idler conveyor belt scale with an Accumass BW100 Integrator. If a breakdown or error develops with the belt scale while the conveyor is operating then often the conveyor will continue to operate until a convenient time arrives to make a repair or adjustment with the scale with resulting loss of data.

There remains a need for a means of measuring the amount of material being processed or moved in an operation such as a quarrying or mining operation which is inexpensive, simple to setup and operate and to adapt to existing operations. There is also a need to know how efficient the operation is running i.e. each step in a quarry, mine or sand and gravel operation is designed to move a certain quantity of material daily at an hourly rate. At some steps in the operation, downtime may occur and if a record is measured of this downtime or "No-load", then this becomes an area that can be improved to increase production. Ideally an operator wants the process to run at design production rates with minimum downtime to maximize production. This invention will provide the measurement tools at a low cost to achieve this goal. In addition if measurements are made at the conveyors coming off the primary and secondary crushers and at some key conveyors going to final stockpiles then these measurements can be used as a new method to compare blasting results.

The invention described herein is based on a new method to calibrate the device, which increases precision and includes new applications for the use of this device, which will help industry to become more productive. This invention is an improvement over an earlier application number JJ-11 384US(USA) and number JJ-384CA(Canada) by Steve McIassac who has worked with the current inventor to improve the accuracy and scope of this new invention over the earlier which focused on the lower cost version based on current readings. This invention is also an improvement over an earlier similar idea the KiloWate PT4 conveyor belt scale based on U.S. Pat. No. 3,942,625.

SUMMARY OF THE INVENTION

The present invention is directed to an apparatus and method for measuring the weight of material such as rock, earth, wood, pulp, grain, gravel, sand, ore, cement etc. being processed or moved by an apparatus such as a conveyor, apron conveyor or bucket elevator driven by an electrical motor. The apparatus comprises a means for measuring the electrical energy consumed by the motor powering the apparatus during operation of the apparatus and a calibration formula for converting the power consumption of the motor to tonnage per hour of raw material processed by the apparatus. A continual record is kept of all "No-load" and "start-up load" time during the recording process and these figures are totalized along with tonnage for the recording period.

In an aspect of the invention, the apparatus is provided with a temperature sensor to monitor the ambient temperature and apply a temperature calibration factor to adjust the output of the apparatus based upon the ambient temperature.

In another aspect of the invention, the apparatus is provided with a belt speed sensor to monitor the speed of the belt and adjust the output should stalling or slippage of the belt occur.

In another aspect of the invention, the apparatus is provided with a digital inclinometer to monitor any changes in angle of a stacker conveyor to adjust the regression formula used in the conversion of kilowatt readings to tonnage by any change in angle of the conveyor as it moves up or down.

BRIEF DESCRIPTION OF THE DRAWINGS

Preferred embodiments of the present invention are shown in the drawings, wherein:

FIG. 6 is a graph illustrating the method used to calibrate a typical conveyor belt with the resulting regression formula to convert amperes to tons (tonnes) per hour for typical conveyor belt;

FIG. 7 is a graph illustrating the method used to calibrate a typical conveyor belt with the resulting regression formula to convert kilowatts to tons (tonnes) per hour for typical conveyor belt;

FIG. 8 is a table illustrating the correlation between the method of the present invention and actual measurement of tonnage recorded by a recently calibrated Techweigh Belt scale (FIG. 1) of material processed in a typical quarry over several weeks of operation. Measurements in kilowatts and amperes are converted to tonnage using the current invention-taking place with a single conveyor belt;

FIG. 8b is a table illustrating the correlation between the method of the present invention and actual measurement of tonnage recorded by a recently calibrated Milltronics Belt scale with Accumass BW100 integrator of material processed in a typical quarry over several weeks of operation. This table illustrates the conversion of kilowatts to tonnes compared to the daily belt scale readings. The No-Load and Start-Up load times that could be used to increase production are also illustrated;

FIG. 9 is a typical graph of kilowatt readings from a motor being monitored;

FIG. 10 is a summary of daily data from a conveyor motor showing converted kilowatt readings to tonnage compared to belt scale reading for the same conveyor. Also illustrated are the hours of lost production due to "No-load and start-up load" occurrences;

FIG. 11 is a typical graph of ampere readings from a motor being monitored;

FIG. 12 is a summary of daily data from a conveyor motor showing amp readings converted to tonnage compared to belt scale reading for same conveyor. Also shown are the hours of lost production due to "No-load" "start-up load" occurrences;

FIG. 13a is a typical Real Time graph showing tonnes/hr converted from a watt transducer and a graph of amps from the same conveyor motor showing the close correlation in both systems;

FIG. 13b is a typical Daily Tonnage summary using No-load adjustment.

FIG. 13d is a typical graph of kilowatts showing the effect of friction build up on a return portion of the conveyor causing a rise in No-Load readings and subsequent rise in kilowatt readings for the conveyor while loaded.

FIG. 13e is the same graph as FIG. 13d but enlarged to show the rise in No-load starting about 3:20 pm from an average of 7.2 kw to as high as 11.2 kw around 3:45 pm.

FIG. 13f is a typical daily summary table showing the impact of No-Load adjustment during rapid rise in no-load readings seen in FIG. 13e.

FIG. 14 is a graph showing typical power consumption in kilowatts of a primary crusher;

FIG. 15 is a spread sheet showing that average kilowatts used by a crusher during a typical days operation including "No-load" time or lost production.

FIG. 23 shows the PDA with the Zero test activated to automatically re-confirm the new no-load reading for the device being monitored.

FIG. 24 the new no-load reading will be used to automatically re-calibrate the conversion formula insuring any changes in mechanical operation are filtered out of any tonnage conversion calculations.

FIG. 25 is a typical Daily summary report for production time and tonnage for each device monitored

DETAILED DESCRIPTION OF THE PREFERRED EMBODIMENTS

The present invention is directed to a method for measuring the weight of material, such as rock, sand, gravel, earth, wood, grain, cement, etc., being processed by an apparatus such as a conveyor or bucket elevator system driven by an electric motor. In particular, the method is directed to converting electrical power consumption of the electric motor driving the apparatus into weight per hour movement of raw material processed by the apparatus. The second part of this invention is using the tonnage rate measurements combined with a "No-load" time as a new means of assessing daily production at each step in the process. Finally in a quarry or mine site where blasting of rock is used as a first step in breaking down rock for processing it is possible to use these tonnage rate readings if set up at several key steps in the crushing and screening process as a new method to evaluate blast fragmentation results.

With the use of the device described in this invention the readings come from the motor operating the conveying device and should any failure or problem develop with the motor or conveying device then the system, if shut down for repairs, will also stop recording data at the same time, hence no loss of data. For areas of a process where belt scales are installed and provide key information for batch processing, then the new apparatus in this invention could be installed at a low cost as a parallel system integrated with the integrator of the belt scale to provide an early warning system of any errors or deviation in readings above a specified acceptable error range.

Using this invention provides a new approach to automation control in mines, quarries and pulp and paper operations where this system may operate in parallel with existing systems thereby insuring no loss of data should an error or breakdown of a currently used belt scale occur.

The other important function of this invention is the continual recording of any "No load" times as well as "over load or start-up load" times. All of these times represent lost production and can also lead to early failure of motors if the "start-up load" time occurrences become too frequent and occur with a conveyor loaded i.e. a conveyor motor will require a large power surge to start operating if the conveyor is fully loaded. This surge can result in increased billing if monthly rates are based on peaks and these start-up surges will shorten the life of large industrial electric motors.

By using an ambient temperature sensor and speed sensor this invention can also improve accuracy of conversion of readings to tonnage by compensating for cold weather effects. As temperatures fall below 0 degrees Celcius there is an increase in no-load power consumption and under cold and snowy conditions slippage of the conveyor can occur.

Figure 1:
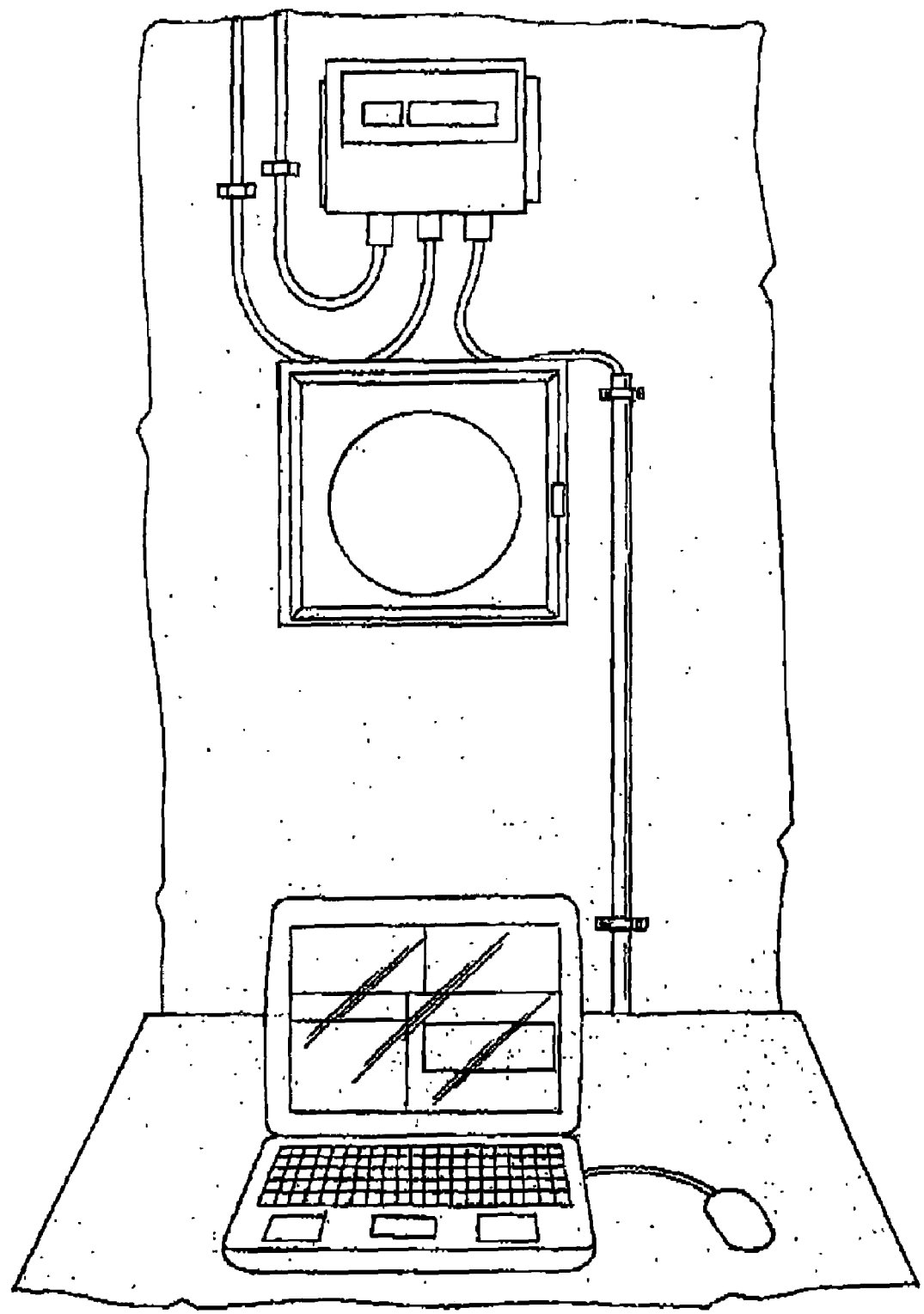
FIG. 1 is a picture of a typical set-up in a quarry with a computer showing live the data being collected from the conveyor motor with also a Real-Time graph of data being displayed.
Figure 2:
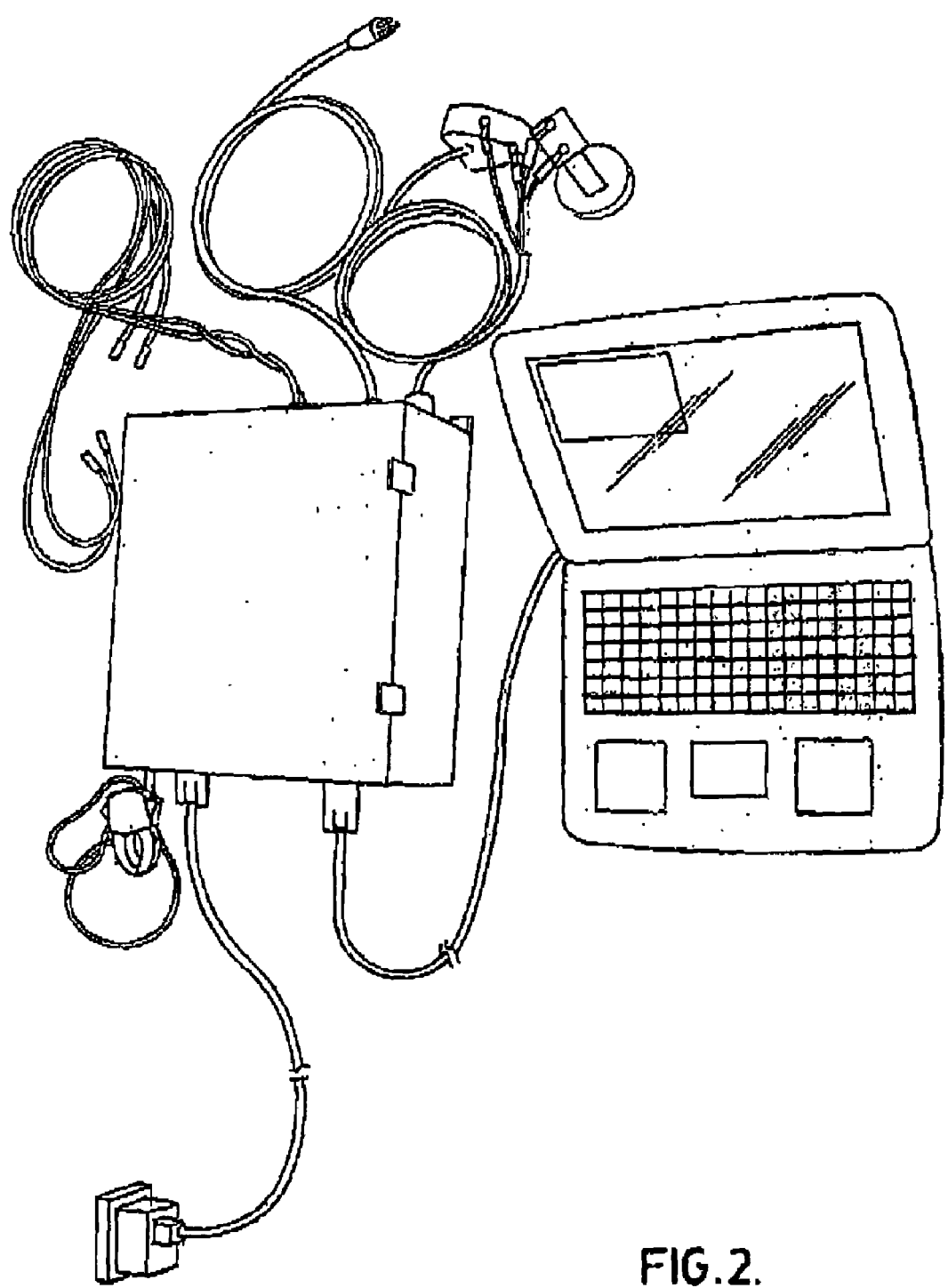
FIG. 2 is a picture of the components making up the apparatus of the present invention using a watt transducer and current transducers for demonstration purposes.
Figure 3:
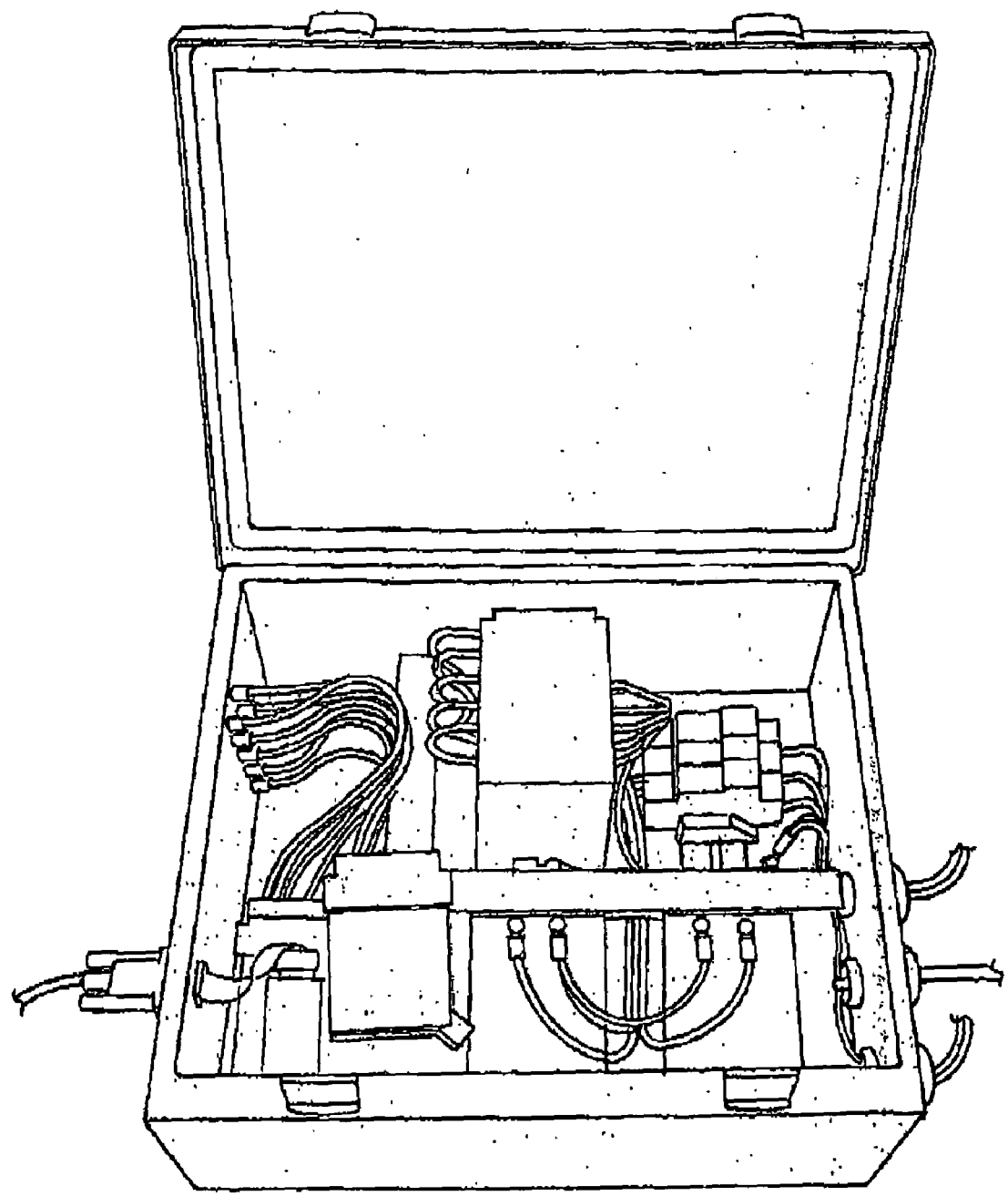
FIG. 3 is a picture showing the Tonnage Analyzer Instrument case with two Data Loggers and watt transducer installed.
Figure 4:
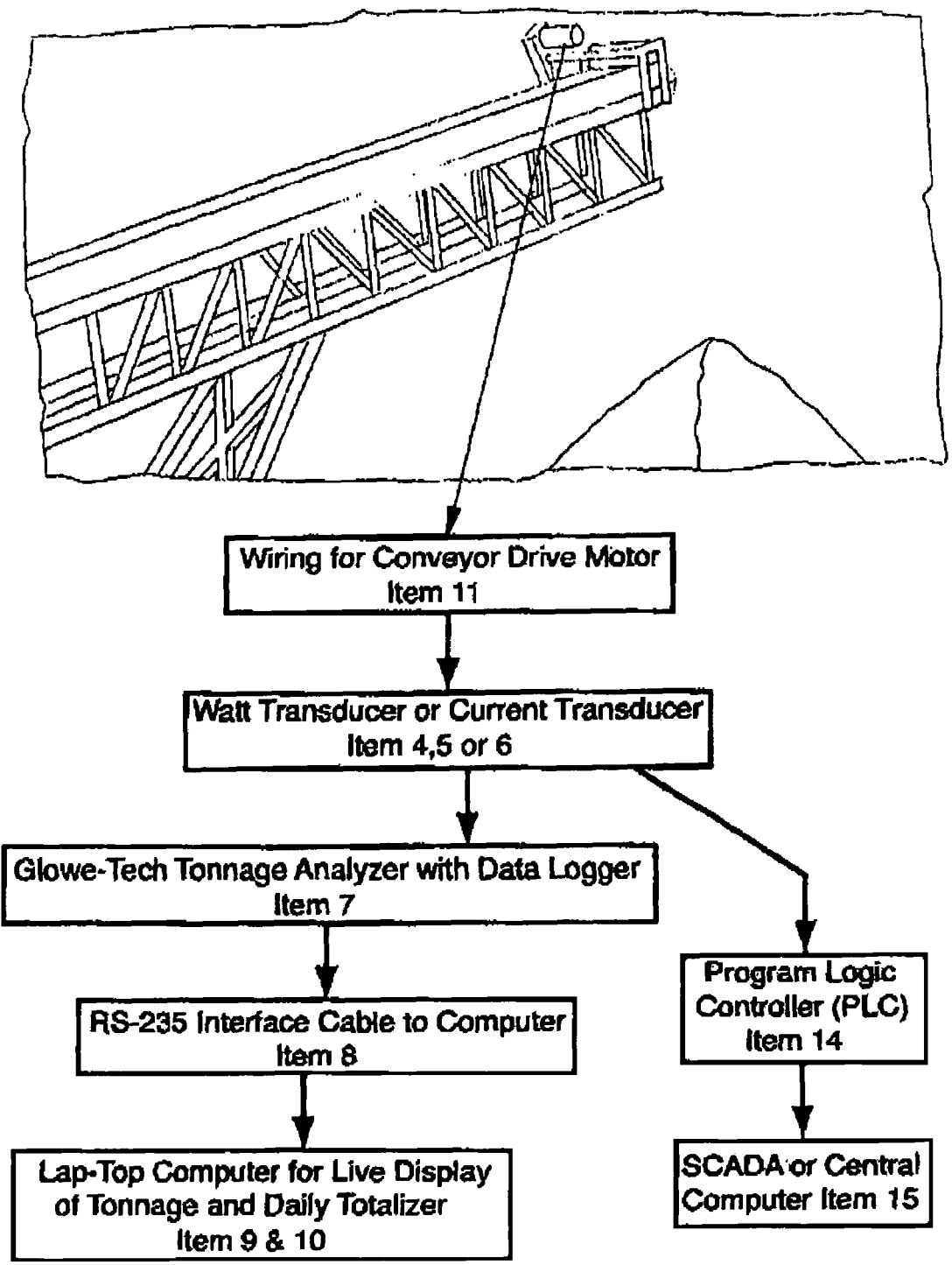
FIG. 4 is a schematic drawing showing a typical layout of the components of the invention.

A preferred embodiment of an apparatus according to the present invention is illustrated by the pictures in FIGS. 1, 2 and 3 and the schematic drawing, FIG. 4. The apparatus is used with a conveyor system which has a motor 13 which is used to drive a conveyor belt system 12. The motor 13 is electrically powered with the electrical power being provided by wires 11, connected to a suitable source of electrical energy such as the local electrical grid or a local generator. As the conveyor motor 13 operates to drive the conveyor system 12 it draws the required electrical energy from the electrical power source. The amount of electrical energy drawn by the motor 13 is related to the load placed upon the motor 13 which in turn is related to the weight of material on the conveyor system 12.

Figure 5:
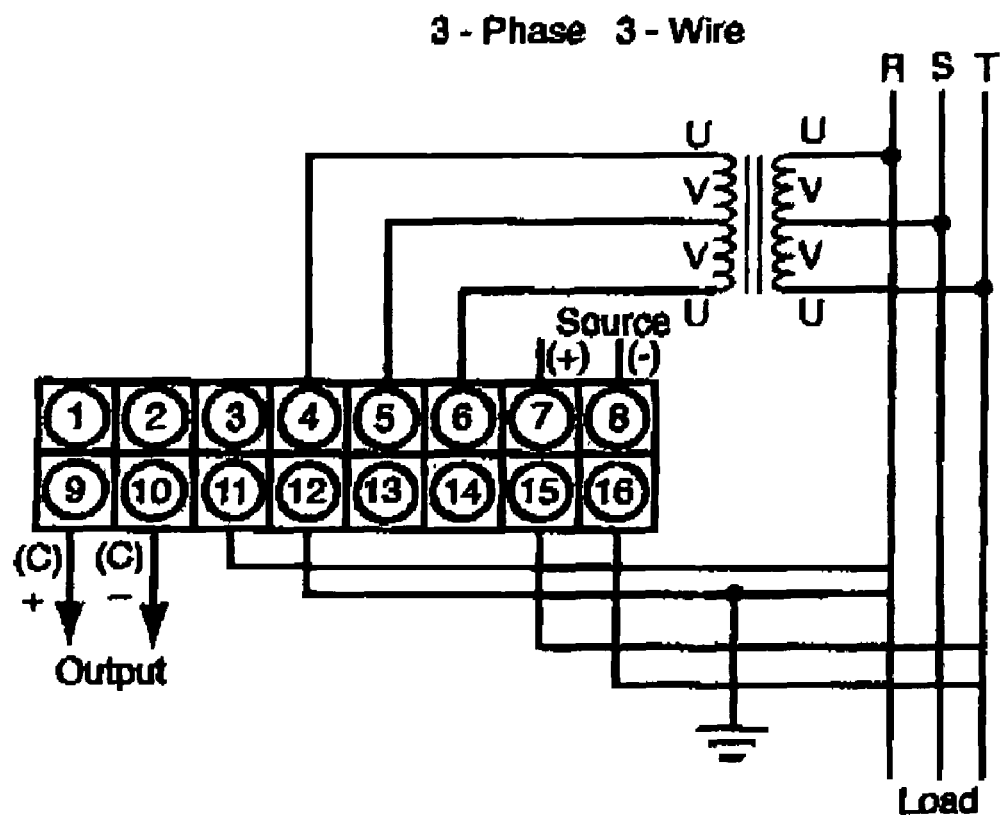
FIG. 5 is a typical wiring diagram showing a watt transducer installation.

In order to measure the amount of electrical energy being drawn by the motor 13, a suitable means for measuring the power consumption of the motor is utilized. To obtain an actual measurement of the power consumption a watt transducer measuring device as seen in FIG. 3, is connected to the motor as shown in the typical wiring diagram FIG. 5. In some applications if less precision (+/−3%) is acceptable it was found that using a current Transducer (CT) ( FIG. 2, item 4 or 5) to measure the current passing through one of the line wires supplying power to the conveyor motor, provided a close correlation to watts being consumed with commercial grid installation. This means for measuring the electrical energy may be hardwired into the system by being connected in series or parallel with the motor 13 depending upon whether the current or kilowatts are being measured. Preferably, in order to easily adapt the apparatus of the present invention to existing mining, quarry, cement or pulp and paper operations, the measuring device is selected so that it can be easily wired into the power distribution panel for the motor operating the conveyor, apron conveyor or bucket elevator. For the watt transducer direct connection to Line 1(R), 2(S) and 3(T) for voltage input and Current transducers are attached to line 1(R) and 3(T) using split core or donut style CT's (instrument grade quality to insure accuracy of readings). One example of a watt transducer used is a GMI watt transducer with donut style CT's (FIG. 2).

Figure 3B:
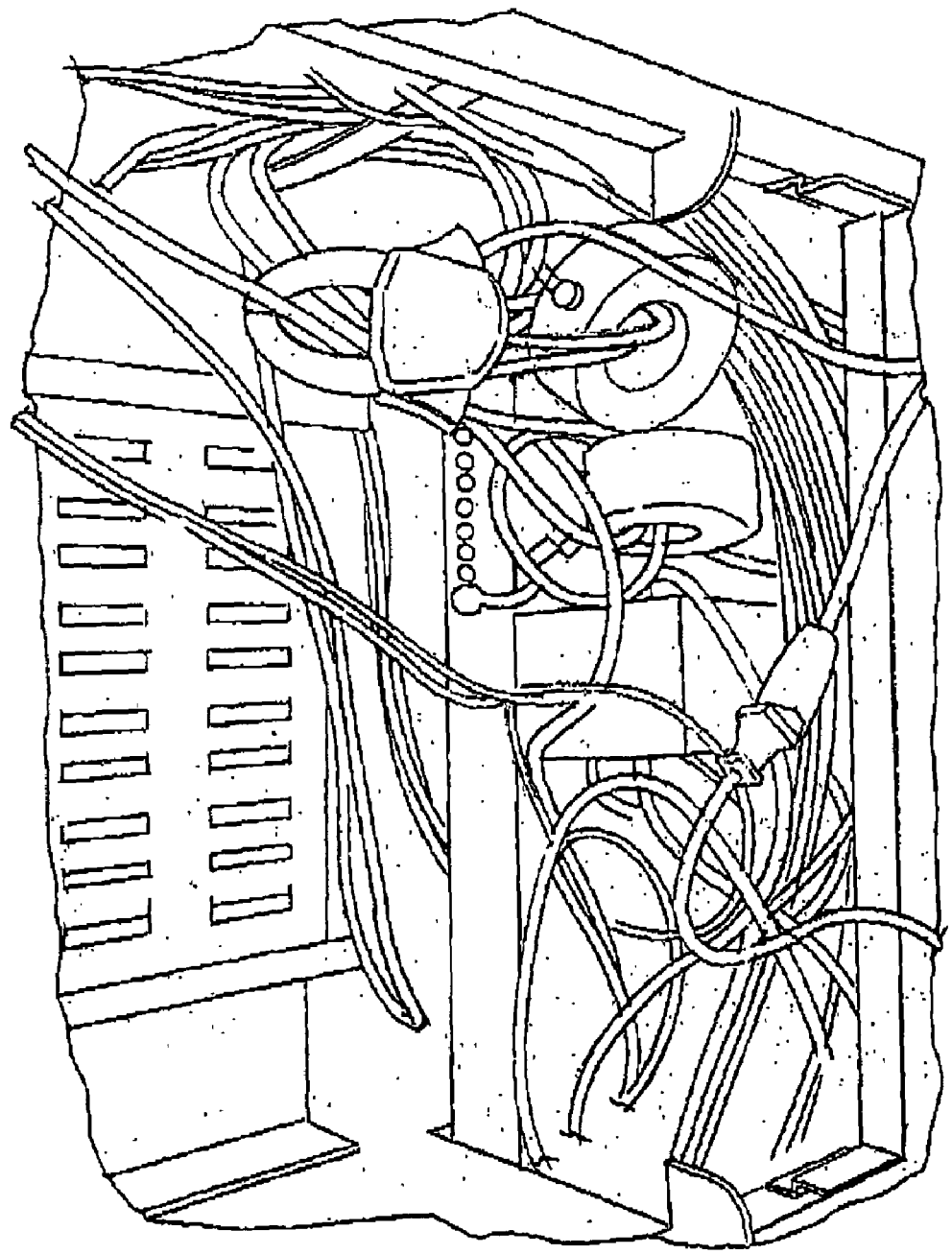
FIG. 3b is a picture showing a typical watt transducer installed for a conveyor motor Tonnage Analyzer. Also illustrated is a clamp AMPROBE CT installed for current tonnage conversion.

For current applications either clamped or split core transducers are attached to one of the line wires, FIG. 3b, item 4 for the conveyor motor and provide an indication of the current passing through the wire. One example of such a device is an AMPROBE current clamp 4 or a GREYSTONE Split Core Current Transducer 5.

The output of the measuring device whether it is a watt transducer or current transducer 4, 5 or 6 are connected to a suitable recording device such as an ACR Smart Reader Plus 3 or Plus 7 data loggers 7 or a programmable logic controller (PLC) 14 which records and stores the electrical readings. The data from the data logger 7 or PLC 14 is passed to a suitable computer 9 or SCADA 15 which converts using calibration formulas the electrical readings recorded by the data logger 7 into tonnage per hour of material passing over the conveyor system 12. This information may be provided on a live basis using Real Time software (as supplied by ACR) or Dynamic Data Exchange (DDE) transfer of data to a central computer 15 spread sheet, via modem or direct connection using a RS235 cable 8 or hard wired directly to a PLC 7.

For set ups where weight measurements are to be incorporated as part of automation controls, the output signal from the watt transducer (highest accuracy) in a 0–5 volt or 4–20 ma format can be fed to a programmable logic controller (PLC), item 14 for conversion to tonnage and relayed to a SCADA or central computer 15 for totalizing or operation of other equipment.

Figure 16A:
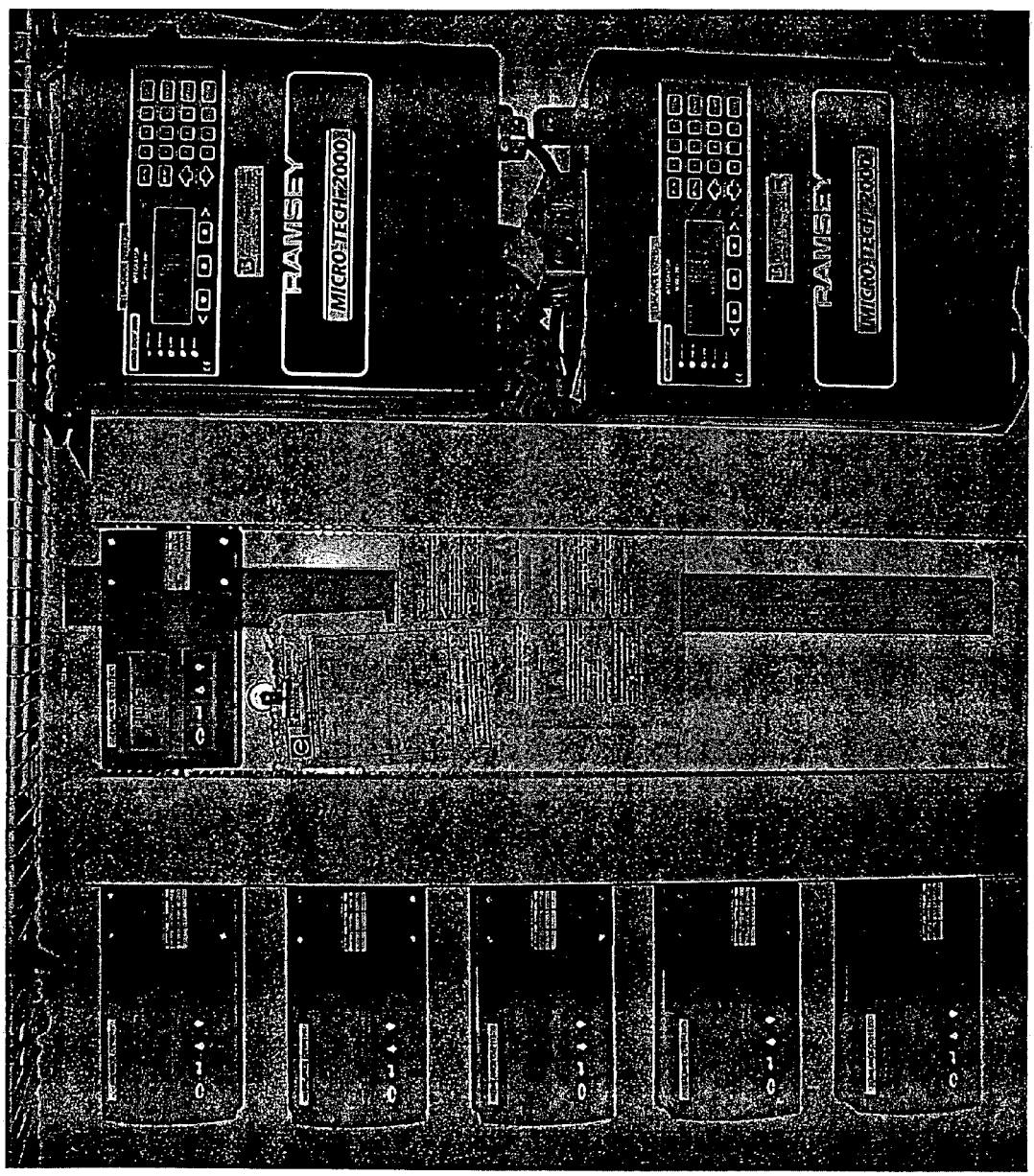
FIG. 16 is a spread sheet showing a summary of daily data from a conveyor motor showing converted kilowatt readings to tonnage compared to belt scale reading for the same conveyor. Also illustrated are the hours of lost production due to "No load and start-up load" occurrences. There is an illustration on the effect of cold temperature and the use of additional calibration formulas to adjust conversion of kilowatts to tonnage as temperatures fall.
Figure 16B:
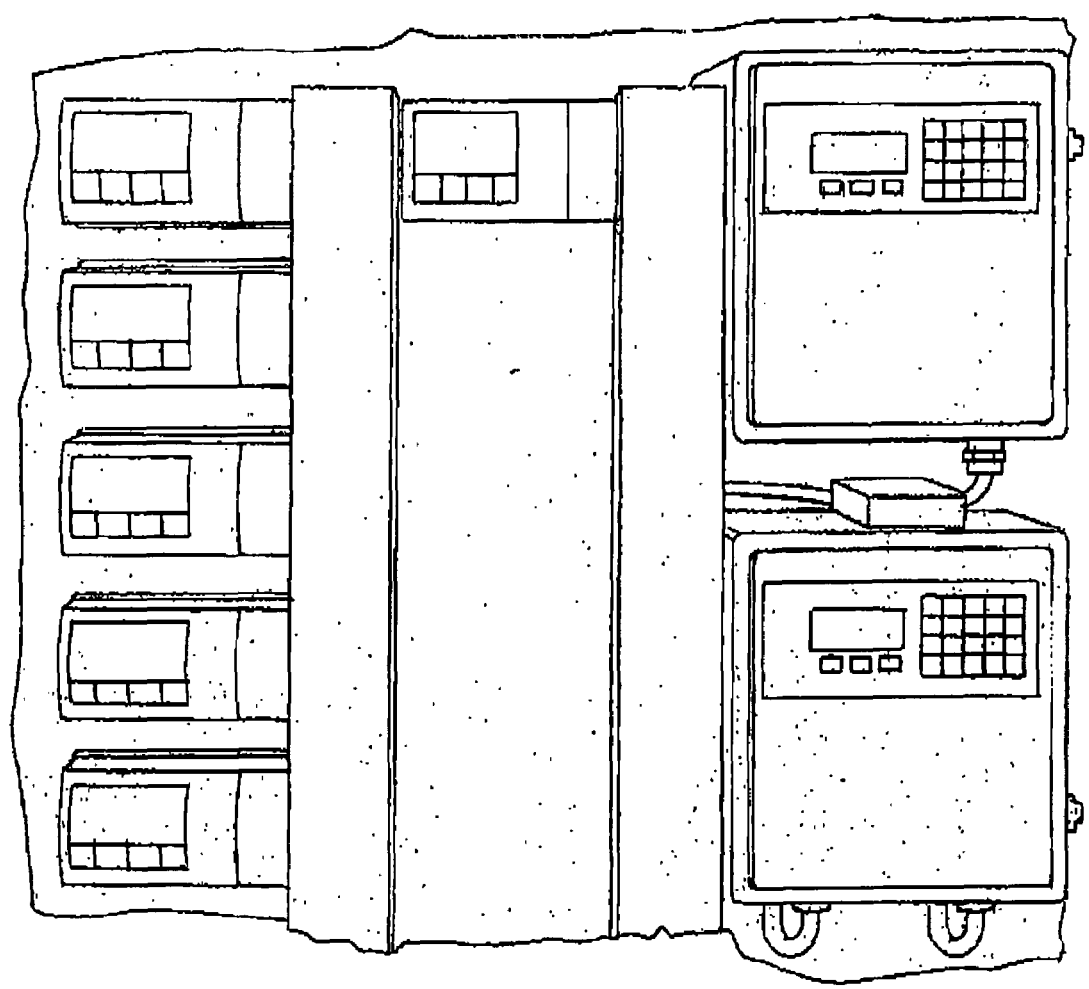
Figure 17:
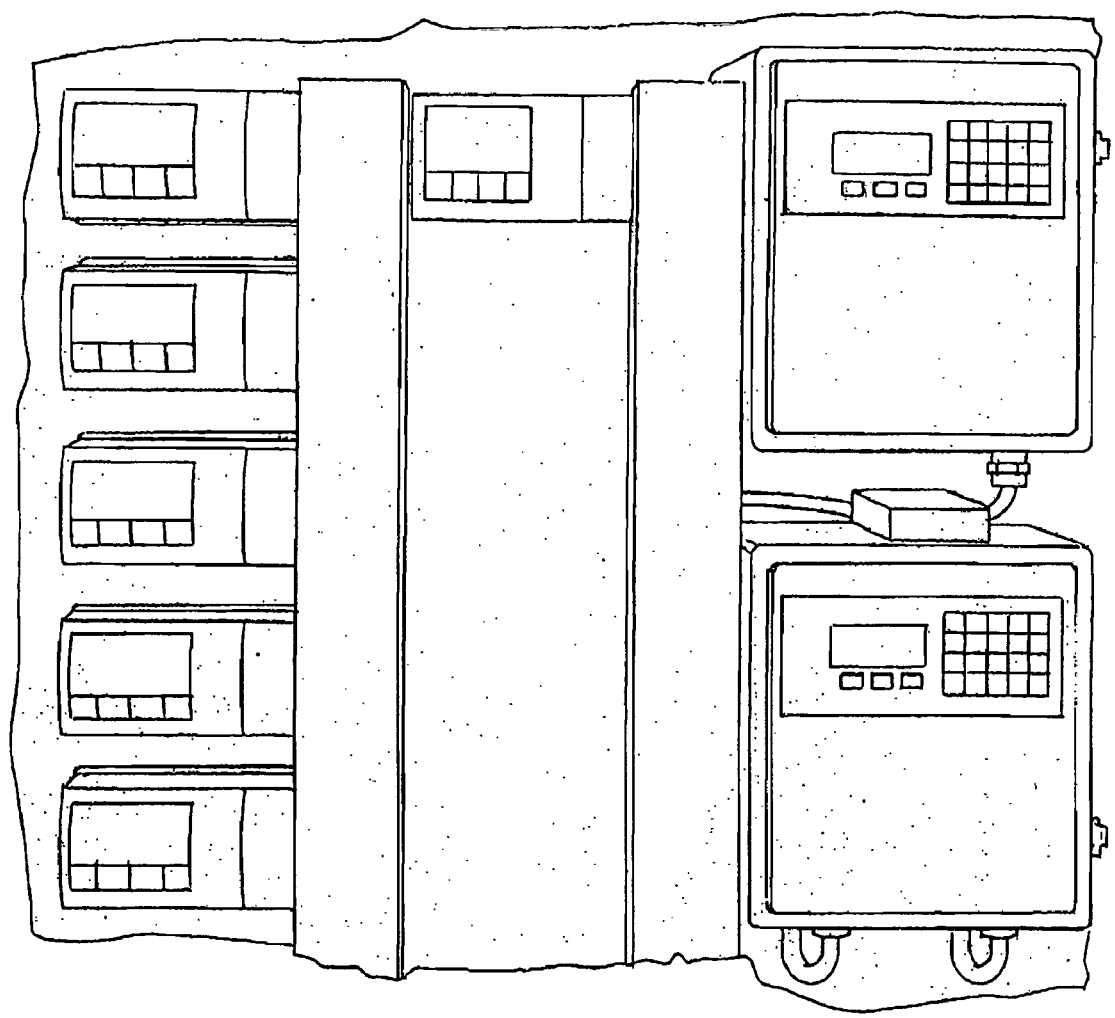
FIG. 17 is an example of a Greymont digital temperature sensor used to measure the ambient temperature during winter operation.

Under cold weather conditions, ie below 0° C., the use of an ambient temperature sensor such as a GREYSTONE TE500 outside temperature sensor FIG. 17, item 16 can be used to record temperature to adjust kilowatt conversion to tonnage as shown in FIG. 16. The 4–20 ma output from this sensor can be relayed to the data logger 7 or PLC 14. Under cold weather conditions if slippage of the conveyor is a possibility then the use of a speed sensor such as a SIEMENS MILLTRONICS Return Belt Speed Sensor (RBSS), Item 17 can be used to measure the change in speed of the conveyor by the change in pulse output from this sensor. This pulse signal from belt speed sensor 17, can be sent to the PLC 14 for recording and by integration the change in speed can be used to adjust the converted tonnage.

The present invention is based on the measurement of electrical energy supplied to an electrical motor driving a processing apparatus such as a conveyor, apron conveyor or bucket elevator system either by the utility power grid or a generator. The electrical energy supplied by the utility power grid is normally well-balanced in the three phases allowing the system of the present invention to measure the kilowatts or simply the current component on one wire feeding the motor to determine the tonnage per hour for a pre-selected interval. The typical electrical motor operating a piece of equipment such as a conveyor, apron conveyor or bucket elevator system in a mine, quarry, cement plant, sand and gravel or pulp and paper plant will consume a certain amount of electrical energy for a short period after start-up to initially turn over the motor-"Start-up load". A second level of power consumption is reached to operate a piece of equipment in an idle manner with no load of material applied to the equipment-"no load". If the equipment settings are kept the same i.e. the angle of the conveyor, length of the conveyor, size, speed, no mud build-up etc. or in the case of a bucket elevator if settings are kept the same, then once the load is applied, the additional power consumed to move or crush the material is directly proportional to the weight of the load so long as at least a minimum load of about 10 percent of the total load is applied on the equipment. As mentioned above, under cold weather, temperatures below 0° C. will begin to effect the results requiring additional calibrations tests below this target to adjust for this effect, FIG. 16. In cold weather, slippage can occur, resulting in a change in speed of a conveyor, however with a speed sensor, this change in speed can be recorded and, by integration, the tonnage figures can be adjusted. One of the keys to this invention is the calibration graph (FIG. 6 & FIG. 7) developed which clearly shows a linear relationship once a small load has been applied. However, this line does not intersect the "X" axis at the No-load setting if projected downward, i.e. it always intersects at a point lower than the No-load setting if projected to this "X" axis.

Figure 13C:
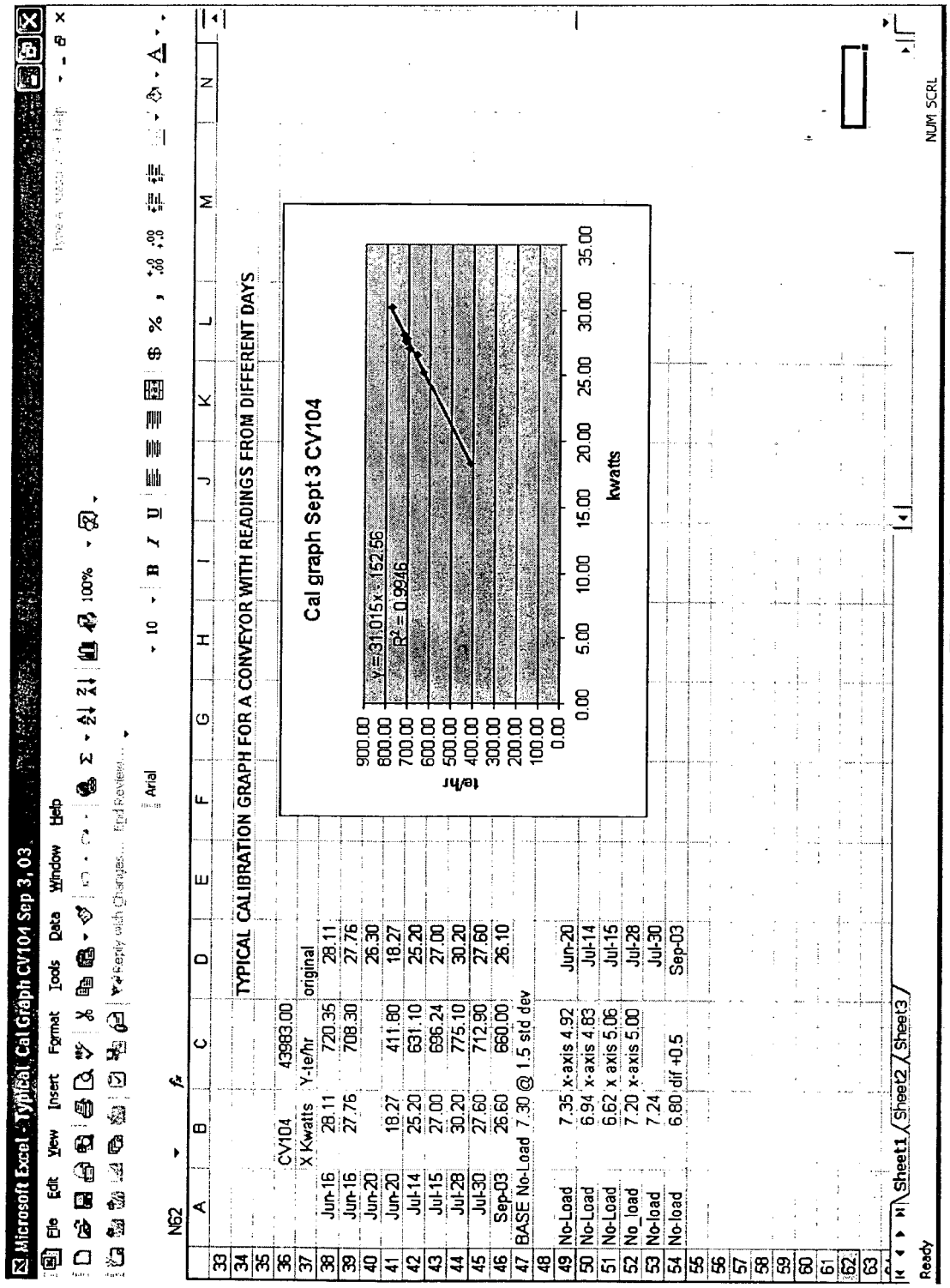
FIG. 13c is a typical Calibration Graph showing the calibration regression formula.

The electrical consumption of the power is measured as kilowatts or electrical current in amperes measured over short intervals between 1 and 8 seconds (the faster sampling rate increases accuracy) per reading and provided to the recording device such as the data logger item 7 to record and store the readings or a PLC item 14. Once several different loads have been timed accurately for a particular piece of equipment, the proper formula for the factors necessary to convert power consumption in kilowatts or electrical current amps to tons per hour for a piece of equipment may be determined as shown in FIG. 6, FIG. 7 and FIG. 13c. Once this formula has been determined, any subsequent readings from the equipment may be easily converted into tonnage per hour utilizing the formula. Periodically (once per month or more frequently if desired) additional material or belt cut loading rates can be taken to confirm the regression formula. Experience has shown that accuracy improves with actual material load tests and, if more than the recommended three tests are made, a better regression formula will result. Results will further improve if real time graphing is operational to check that material tests are made while at stable loading rates on the conveyor, apron conveyor or bucket elevator. As with belt scales, it is recommended that the No-load setting be checked daily after equipment has had a chance to warm up. This procedure can also help to provide early warning of possible equipment failure should a significant change in "No-load" figures be detected (FIG. 10 and FIG. 12).

The system of the present invention as described above was applied to conveyor systems in a variety of quarry operations. The watt transducer and current transducer measuring devices were attached to the three wires of the three-phase electrical input to the motor driving a conveyor belt of the quarry system. This motor was fed by the local utility grid. The output of the watt transducer and current measuring devices were connected to the input of a Tonnage Analyzer data logger which measure kilowatts, AC current, pressure and temperature (FIG. 3 capable of monitoring 14 conveyors or bucket elevators and expandable up to 42 input signals).

The output from the data logger, item 7 was connected to a suitable computer, item 9 utilizing a standard interface port such as RS 232, item 8, USB and DDE. The measurements for tonnage per hour were calculated using a regression analysis function in a suitable computer spreadsheet. The calibration of this system is illustrated in FIG. 6, FIG. 7 and FIG. 13c which is a graph of the amperage or power consumption of the motor vs. tonnage per hour of the conveyor belt system. As can be seen from FIG. 6, the motor in a no-load situation draws approximately 20.4 amps and in FIG. 7 which shows the calibration graph for kilowatts to Tonnage the "no load" reading is 12.5 kwatts. As the load on the motor or the amount of material applied to the conveyor system is increased, the amount of amps or kilowatts drawn by the motor increases gradually until the load on the motor is sufficient to provide a linear relationship between power consumption and tonnage per hour on the conveyor. Typically this will be on the order of 10 percent of the rated capacity of the conveyor system and well below the normal operating parameters of the system. From the data measurements as shown on FIGS. 6, 7 and 13c the regression analysis formula for this particular setup was calculated. A number of test runs were then conducted in which known loads of material were placed on the conveyor system and the predicted tonnage per hour output based on the regression analysis formula compared to the actual tonnage per hour of the samples. The results of this are shown in FIGS. 6, 7 and 13c. As clearly seen in FIG. 10, there is an excellent correlation between the predicted and actual tonnage per hour for this system using kilowatt measurements. FIG. 9 shows the graph of actual kilowatt consumption for a typical day. It is the actual readings taken from this graph which forms the basis for the conversion to tonnage as shown in FIG. 10. As an option, once the calibration formula has been established as shown in FIG. 7, then the graph in FIG. 9 can be set up to show live tonnage readings as shown in FIG. 13.

The same procedure applies to amperage conversion as shown in FIG. 11, showing a typical Amperage graph and FIG. 12 shows the spread sheet converting readings to Tonnage. In FIGS. 8 and 8b we have tables showing the summary of several days of data collection and results compared to belt scale readings for the same days. In FIG. 8 we show the comparison between readings taken with amperage versus kilowatts converted to tonnes. In FIG. 8b we show the conversion using kilowatts as well as the 'No-Load and Start-Up load' times which illustrates the potential for production improvement if these times could be reduced.

The whole system has also been set up with all outputs from transducers fed directly to a PLC at 1 second intervals with all readings being processed directly on the Automat showing kilowatt readings and converted tonnage per hour rates and totalized tonnage.

If the electrical power is supplied by a generator and the power is not well balanced then only the watt transducer method is recommended as the most accurate measurement of the power consumed to relate to tonnage per interval of time. In each case it is necessary to isolate the readings of electrical power in kilowatts or current in amperes which correspond to a "No-load" situation on the equipment to ensure that the cumulative data per period of time only includes readings when the equipment is running loaded. In the Real Time or Automat program there is a separate No-Load test that can be run which takes the average of readings recorded while the conveyor or bucket elevator is run empty and we add 1.5 to 2.0 Standard deviations to the average to calculate the No-Load reading, FIG. 13b. Likewise if frequent stop-start cycles occur especially with loaded equipment then these overload readings "Start-up surges" need to be isolated and recorded separately, to ensure daily power consumed as related to tonnage is only applied to readings were there is an actual material load on the equipment It is very important to note that an essential feature of this aspect of the invention is the recording of these separate readings ie "No-load" and "start-up surges" which provide valuable information on lost productivity which can lead to large opportunities for improvement. In the case of "Start-up surges", this invention could help to extend the normal operating life of the conveyor motor by providing a record of these occurrences. If they became too frequent then ways could then be found to reduce these start-up surges with the additional benefit of increased production.

While the above example is described in connection with a conveyor system in a quarry operation, the present invention is not so limited. In addition to quarry or mine operations, conveyor systems, apron conveyors and bucket elevators in many processing industries such as cement plants, pulp and paper mills and processing plants for grain and other food stuffs, sand and gravel pits, etc. can also use the apparatus and method of the present invention.

It should also be noted that in the portable format using the data logger, the same system can be applied to a portable crushing plant with motors operated by hydraulic systems. Instead of using a watt transducer, a pressure transducer can be used with the ACR SmartReader Plus 7 model and the same procedure described for watts can be applied to the pressure sensing device measuring psi used by the motor at various operating levels.

A further aspect of this invention is the use of this invention on a stacker conveyor. On a Stacker Conveyor, if they move up or down we need to add a further measuring device to input the angle of operation i.e. as the conveyor moves upward there is an added force added to the components being measured. This may be achieved using a digital inclinometer, item 18 such as a US Digital A21 or an Xbow Tilt Sensor model CXTA01 with RS235 outputs. With either of these angle measuring devices, a signal can be fed to a PLC to provide data on the angle above horizontal the conveyor is operating. The calibration process described above is repeated for differing loads at a minimum and maximum angle of operation. A new regression formula is calculated for each change in angle and as the conveyor moves upward or downward the tonnage moved will be adjusted accordingly.

With the watt transducer model another aspect of this invention is the new ability to predict the maximum full load capacity for each conveyor or bucket elevator based on the motors specification and the corresponding tonnage per hour reading possible when the motor is operated at its maximum designed kilowatt rating. In other words, once the calibration formula has been established, then the maximum kilowatt rating of the conveyor or bucket elevator motor can provide a direct conversion to tonnage the motor can be expected to move at that kilowatt reading.

A further aspect of this invention is the use of the output signal from the watt or current transducer as an input signal for automated systems to help adjust feed rates by feeders to a crusher. If the feed rate is too high, then presently available automated system may shut down a conveyor feeding a crusher rather than just adjusting the feed rate to provide a continuous flow to the crusher. In the case of a cone crusher, the best results will occur if the crusher is kept full all the time and no start and stops occur. Fewer start and stop occurrences which will increase motor life, improve accuracy of tonnage readings and result in higher quality crushing of rock.

The present invention is applicable to any operation where an apparatus or machinery is powered by an electrical motor and where it is desired to measure the tonnage output of the machinery such as a bucket elevator, apron conveyor or stacker conveyor. Another important application of this invention is to set up this system in parallel to an existing belt scale application as a low cost method of cross checking the tonnage readings being recorded by the belt scale. Belt scales can lose accuracy if a rock falls on the frame or material builds up around the frame or the idlers become misaligned etc. In modern quarry and mine sites where belt scale readings become the input data for automation control setups, a means to insure accurate data is being continuously provided is more critical and the present invention, if installed in parallel, provides an early warning of any deviation in readings, avoiding errors in batch and blending processes. The apparatus and method of the present invention may also be used as the primary system providing a lower cost and maintenance free system for accurate measurement of tonnage of material.

The apparatus and method of the present invention provides an improved and faster method of measuring weight in tons (tonnes) of material over a device or moved by a piece of equipment at lower cost and with the capability of showing these tonnage reports locally or by telecommunications device to a remote location. This method may be applied at several locations in an operation and will provide a new way to measure tonnage and productivity through out the operation.

Finally as mentioned at the beginning, this invention provides a new simplified method to compare blast fragmentation results. In the Mining and Quarrying Industries today all operators have a common goal to increase productivity and lower overall operating costs. Often it is easier to measure a localized improvement, which sometimes can actually increase overall costs and lower production rates at other parts of an operation. What complicates this process is the multitude of variables that occur in the transformation of solid rock to a final rock size or series of sizes and shapes with the least amount of waste. To further complicate the overall picture is the ever-changing choice of products and equipment advertised by manufacturers as ways to lower costs and improve production. One of the greatest challenges facing operators is finding ways to easily measure productivity improvements at each step in an operation to insure overall reduction in operating costs.

In industry today beginning with drilling and blasting there are many methods currently used to measure and compare results such as digital photo analysis of blasted rock fragmentation, actual sieve analysis, time studies to excavate a blast, just to mention a few. These methods will give good results for parts of a blast but not the entire blast and they are fairly complicated to use. Then there are the variables of actual geology at the site, which can vary from one location to the next. When you get to the crushing and screening of the rock, a whole new series of variables can influence the results such as choice of crusher, actual settings of crushers and screens which will alter the results as the rock is processed. With all these variables it will always be difficult to find a method which gives an actual overall comparison of results. However with today's technology and computer assisted measuring devices it is possible to build a model, which gives a much clearer picture on the actual energy consumption and production rates at each key step in the operation. Using this approach it has been found that such a model can be used to compare results of blasts and get a good correlation at the primary and secondary crushers to compare production rates and final split in low end and high quality crushed rock products.

In the simplest terms the process described herein is a new way to achieve this overall goal of reducing costs by comparing measurements of energy costs for explosives with energy consumption in kilowatts to operate equipment to process the rock. These measurements when taken at key steps in the operation combined with production rates will give a surprisingly clear picture of the overall productivity and total operating costs.

In the case of mining and quarrying, where drilling and blasting are the first stage in the process to break rock for further processing, there is a need for a low cost and fast method to optimize results from drilling and blasting to maximize production in the crushing and screening stages in the operation. To do this a new process has been developed using the apparatus of the present invention, FIGS. 2 and 22.

The apparatus of the present invention with its multi channel data logger is a new computerized process to measure tonnage and productivity in a Mine, Quarry or Sand pit operation combining several measuring device readings to establish a base line. This multi-functional process uses power or pressure transducers to input information from motors if data from belt scales or motor metering devices is not already available. With this process it is now possible to combine live conveyor tonnage productivity at key steps in the operation, with live power consumption readings at the Primary and Secondary Crushers using watt transducers. These measurements can then be used to compare individual blasts to optimize blasting results thereby achieving improved production at the primary and secondary crushing and screening stages of the mine or quarry. In other words, changes made at the drilling and blasting stage can be evaluated by comparing production rates with actual tonnages of final rock products produced versus percentage of lower end products such as fines or pit run materials.

One of the keys to the success of this process is the ability to easily identify loss of production at each step in the operation, which shows up as "No-load and start-up" time. Reducing this "No-load and start-up" time, which is often a direct result of oversize rock, can often be achieved by spending more money on drilling and blasting to reduce oversize. In this new process added cost at the drilling and blasting stage can be compared to downstream increase in production with a lowering of overall operating cost.

At quarries and mines blasted rock is the first step in the production process. The input data used by the apparatus of the present invention begins with power consumption readings from the primary crusher (FIG. 15). If a rock breaker is used to break up oversize at the primary then a pressure transducer operating off this motor can also be monitored to show power consumed and possible down time at this stage. The use of the pressure transducer will help to separate time waiting for trucks to dump at the crusher versus time used to break up oversize rock with the hydraulic breaker.

After the primary crusher all major conveyor motors operating belts at each stage in processing are then monitored with the apparatus of the present invention. If belt scales are installed, these readings, if available as digital readings, can be used as an alternate source; however it is important belt scales are zero checked each day to insure consistent readings. All of these readings form the basis of this new process to measure productivity and will also provide a new simplified method to compare blasting fragmentation results from similar blasts.

Each blast is monitored showing the total energy, above a No-load level used to crush rock at the Primary crusher, FIGS. 14 and 15. Moving downstream all main conveyors moving crushed or screened rock are monitored for daily production rates and total tonnage produced for each final rock product size. At each conveyor we also have energy consumption figures in average kilowatts used during a recording period to compare with tonnage rates, FIG. 10.

There are many variables which influence the overall production process. The measurements we are taking will provide clear indications of trends and will generate repeatable and accurate results. For the conveyors and the primary crusher the zeroing function used with power transducers will filter out most outside variables, which may otherwise distort readings. With use, other variables will be identified, and ways can then be established to filter out or include this new data to better refine the overall process.

Using tonnage production rates and power consumption rates in kilowatts at crushers will provide a new way to compare blasting results and show the impact on the full process when changes are made at the drilling and blasting stage. At many operations today the drilling and blasting stage is often under pressure to reduce costs, as are other parts of the operation. Drilling and blasting is one of the easiest areas to measure costs and lowering cost at this stage often results in larger fragmentation where productivity is much more difficult to measure. The apparatus of the present invention will help to insure any changes occurring in one area can be easily measured throughout the production process to confirm if an overall improvement has been achieved. With continual improvements by industry, with new products for blasting and new equipment for crushing and screening it is important to be able to evaluate the impact of these new products or equipment on the existing production process. The multi functional apparatus of the present invention will insure all areas of the plant work at optimal levels and any benefits from new products or equipment will be measurable to see their impact on the production cycle.

This system becomes a useful tool to help operators to see their live production rates (tonnage/hour), daily production in tonnes (tons) and the motor monitoring function will provide early warning of possible overload conditions. In Mines and Quarries, the combined production and energy consumption figures become a new method to compare blasting results. For the manager this process can be used to determine maximum production rates at each stage in the process. For planning purposes the apparatus of the present invention can be used to establish the time and tonnes (tons) of blasted rock required to produce a future order for a specific stone size. Similarly a breakdown of other product sizes produced will be shown to help management decide the best split of products to produce, which will bring the highest margin.

The apparatus and process of the present invention is a new process using advanced computer automation control devices to collect and analyze data but keep output data in a format that is easy to read and interpret. The overall process can be further expanded to include additional input data such as loader and truck scale readings. This additional information may be useful in comparing blasting results but still needs further research. The main purpose of this present process is to help industry to better understand the overall process and help integrate all operations to optimize overall productivity.

In some circumstances it has been found that the No-load reading from motors may vary from one day to the next when the motor is oversized for the application, and as a result the No-load reading can move up or down. If the No-load changes, then this change will continue to cause the same shift as load is applied to the conveyor or crusher. What happens is the slope of the graph shifts depending on the difference in readings. This can introduce an error with the calculated tonnage conversion rates.

To adjust for this, it is preferred that the No-Load is actually measured daily and if there is a small change in No-load then the difference in readings can be included in the regression formula that was developed for the conveyor. The end result is a more accurate tonnage figure for the day. This same principle will help to keep this device on track during cold weather operations which was identified last winter during low temperature testing with a temperature sensor.

The key components of the spread sheet, FIG. 13b to convert kilowatts to tonnage are as follows: cell E4 is the No-Load reading in kilowatts to operate the conveyor or crusher empty with no material movement. This figure should be checked daily after warm up, to verify there is no change. The actual check can be made by taking readings for at least 2 cycle times of the conveyor or typically for 2–5 minutes as shown by readings in column H and I. From these readings we need to calculate the average and the standard deviation. The actual No-load reading will be 1.5 to 2.0 Standard deviations above the average. This reading is then compared to the original No-Load taken during the initial calibration for this conveyor. If there is a difference, (Cell I9), then this difference is applied to the original calibration formula to give a new calibration formula (cell G11).

2. Cell E5 is the peak load for a conveyor or crusher and represents a full load reading under normal full load conditions. If a crusher or conveyor is re-started under full load then a momentary peak may occur which will be capped out at this level to avoid additional kilowatts being added to our conversion to tonnage.
3. Cell C8 is the total operating time, which is converted to total production time cell E8 by subtracting the No-Load time, cell E6.
4. Cell E9 is the average kilowatt reading for the day.
5. Cell E10 is the converted daily kilowatt reading to tonnage using the regression formula for the conveyor based on actual weighed quantities of material over the conveyor for measured periods of time. This formula can be adjusted as shown in cell G11 by taking into account any changes in No-Load. This adjustment will automatically correct for any mechanical changes that might occur with the crusher or conveyor or any major temperature changes as we move from warm to cold operating conditions. It is important that this No-Load test be carried out only after a minimum 30 minutes of operation to insure that the crusher or conveyor has reached normal operating conditions.
6. Cell E12 is an actual conveyor belt scale reading, which can be used, to compare with the readings being generated by Glowe-Tech Tonnage Analyzer.
7. Column E is the actual readings in kilowatts with any readings below the No-Load deleted.
8. Column F is the actual converted kilowatt readings to tonnage and are the tonnes per hour reading for material moving over the conveyor.
9. Column G is the tonnes/hour converted to a totalized tonnage by dividing by the sampling rate, ie, 450 or every 8 seconds. On an Automat version the sampling rate can be increased to every second.
10. Cell G13 is the total of all the readings in Column G and becomes a cross check of the tonnage figure in Cell E13.
11. Column G, Calibration formulas illustrates the changes in tonnage using several formulas based on several sets of material tests conducted on this conveyor. The actual formula being used is the Jun. 20, 2003 version or formula 3, which is being adjusted if there are any changes in the No-Load. It is important to note that if we do not adjust for the changes in No-Load then increased errors in converted tonnage as high as 25% have been measured especially if mechanical changes occur on a conveyor such as bearing failure of a head pulley. If a significant change in No-Load is detected this can become an early warning of a potential failure of the equipment.

Note cells highlighted in RED are cells that are adjusted by the length of data collected in columns A and B.

An example of a typical conveyor graph showing several no-load readings and loaded readings ie readings around 7.4 are the conveyor running empty is shown in FIG. 13d. When the No-Load readings move up to over 12.0 there is dirt jamming by the counter weight on the return side of the conveyor. This graph shows a rising in No-load readings after 3:20 pm. This resulted in a major rise in No-load readings which if left unadjusted would have resulted in a reading over 1000 tonnes of extra tonnage for the day. The first spread sheet FIG. 13b shows the early part of the day with normal operating conditions and a No-load reading of 7.403 which was 0.103 higher than the original no-load reading taken during the day the conveyor has calibrated. The 1001 tonne over run, occurs if the no-load remains at 7.403. However if new no-load readings taken during the higher no-load period are used to re-adjust the calibration formula, FIG. 13f, then the calculated reading is similar to the original belt scale reading. This conveyor has a Milltronics BW100 belt scale so the 2 systems can be compared daily. The apparatus of the present invention gave results within 0–2% of the belt scale when a zero test adjustment was carried out daily for about 2 minutes normally around 12:00 noon. It was also found that the no-load moves up and down daily with small adjustments of 0.15 to 0.30 typically occurring. It is important to do a no-load test the same day a calibration tests is run with material tests so the new readings can be adjusted to the original by the difference in no-load readings. If a 2nd set of tests are done with a no-load +0.15 kwatts higher than the original calibration run, then the actual readings for a given material test would be lowered by −0.15 kwatts. If the No-load were actually lower, then the test results would be increased. By doing this it has been found that the data points become more linear. The graph in FIG. 13c is a typical calibration graph for the conveyor.

A version on how to use this new technology to present data in a quarry using an existing Automat program is as follows. This is accomplished by simply adding the results of the application of the present invention to the Automat program using the OPC server program which is normally included with most Automat programs. This method makes the installation very quick. By using the Automat program it becomes easy to use all the graphing and report features that are included in the Automat program. The user gets to see the tonnes per hour of material moving over the conveyor, the total tonnes for the day accumulated and the total tonnes since the beginning of the year. In addition to the reviewed data all data is also presented graphically. All of this information comes from the kwatt readings taken every second which are then checked that they are above the No-load reading, then converted to tonnage by the calibration formula. The number is divided by 3600 to get a tph reading and totalized. The time is also stored so each reading above No-load is stored as production time and all readings at No-load or lower are stored as No-Load time or non production time.

Figure 19:
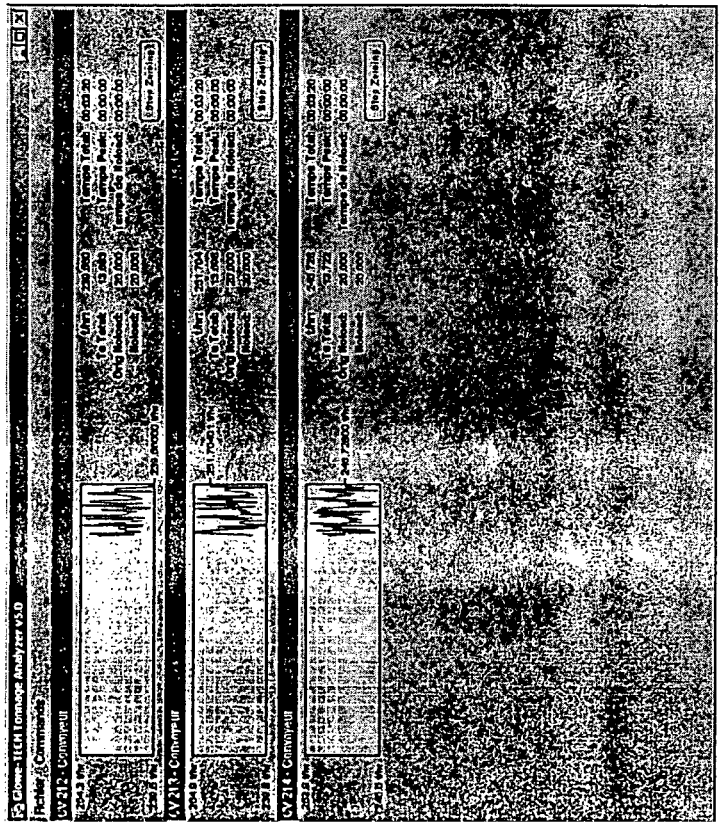
FIG. 19 is an example of an Automat program display showing the Automat version of the Glowe-Tech Tonnage analyzer with the Zero test page. This page allows the operator to run a manual zero test or the Automat can schedule the test daily at a specified time.

The second page from the Automat program shown in FIG. 19 is the Zero test page which allows the operator to do an automatic Zero test to check the No-Load reading of the conveyor or crusher. This test can be set up within the Automat program to be automatically run each day at a specific time such as noon hour. This test can only be activated once the conveyor is running empty and then runs for 200 seconds or approximately 2 cycles of the conveyor. At the end of the test all readings are averaged and 1.5 standard deviations are added to the average to give a new mathematical No-load reading equivalent to about 90% of the peak readings taken during a typical test. The new No-load figure is displayed and if there is a change compared to the original No-load reading set at the time the original calibration tests were run, then the difference in No-load reading is applied to the calibration formula derived from a regression calculation. If the No load is higher then the difference is taken off the regression formula and if lower the difference is added to the formula. An example is as follows; the regression formula is tonnes=30.385*kwatts−149.62(difference in No-Load*30.385)' where 30.385 is parameter 1 and 149.62 is parameter 2 from the standard regression formula from a graph of a line through a series of points, FIG. 13c. This revised formula helps to improve accuracy and overcomes many variables that could otherwise distort readings such as changes in temperature, increased friction due to failing idler sets or even bearing failures, windy conditions versus no wind etc.

Figure 20:
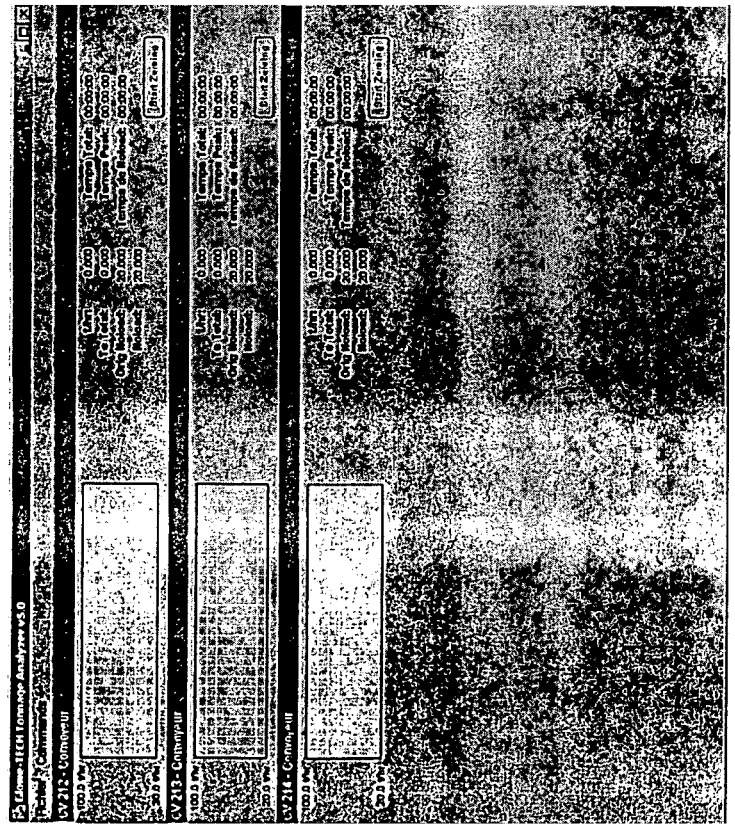
FIG. 20 is an example of an Automat program showing the Glowe-tech Tonnage Analyzer with the Material Test and input data saving option used by the operator to calibrate the program.

The 3rd page shown in FIG. 20 is the material test or calibration test page where all data during a test of loaded material on a conveyor is recorded. Material that has been weighed is loaded on the conveyor or material after it has passed over the conveyor is weighed at a truck scale. With this page the kwatt readings are secured and an average of these readings while a measured quantity of material is moved by the conveyor is calculated. The test is repeated with the material fed at different rates to get 3 or more points on the graph to run a line through the points and get the regression formula for these points, FIG. 13c. It is desirable to also run a No-load test either just before or just after these tests to establish the base No-load reading from which all other test points can be compared and adjusted if taken at a latter date and the No-load shifts a bit. These little adjustments have helped to improve accuracy of conversion to tonnage and standardize procedures to insure repeatable results.

Figure 21:
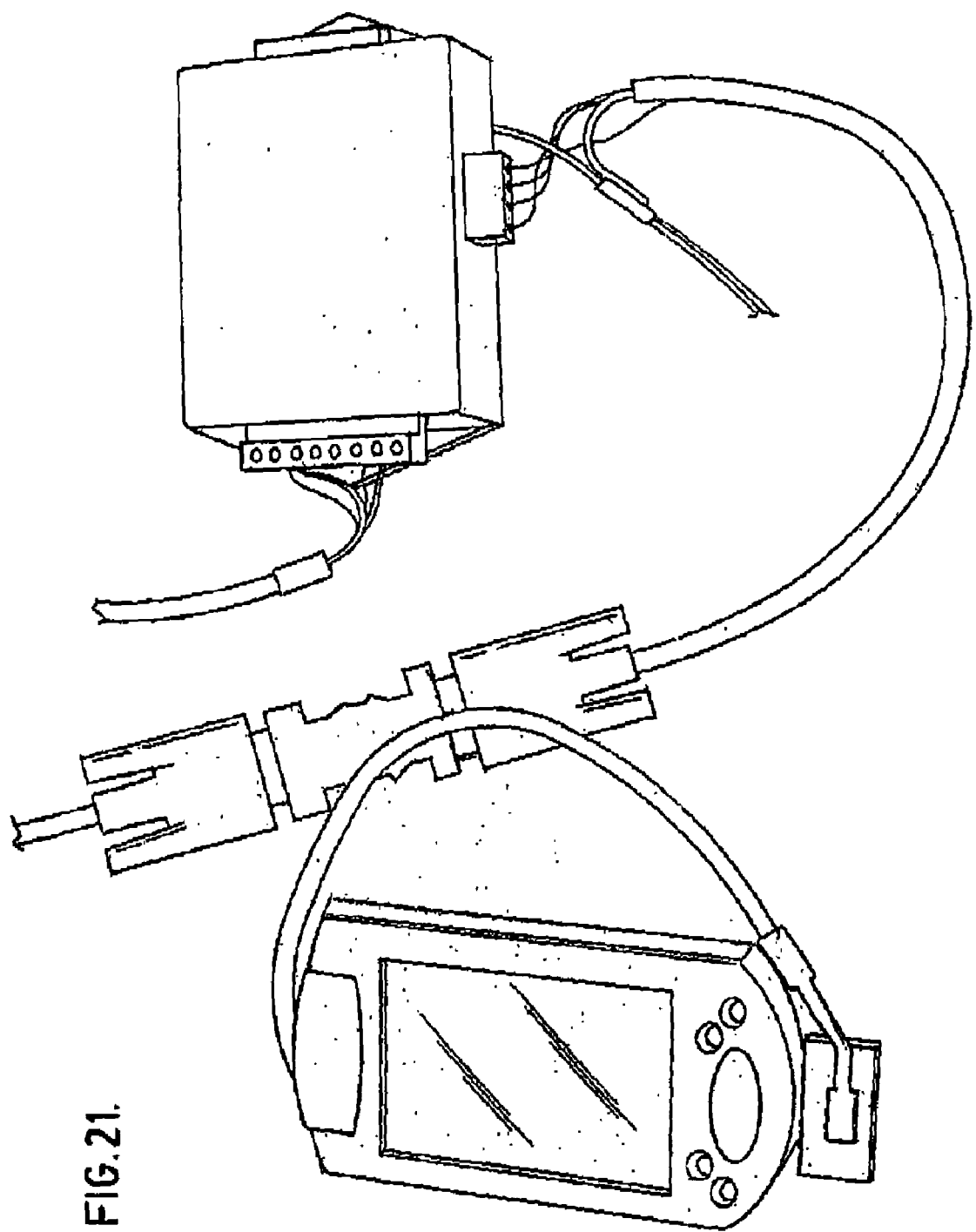
FIG. 21 is an example of the most recent version showing the use of a PDA or Pocket PC (iPAQ3850) with an Analog Data Logger collecting data live from a watt transducer in 1 second intervals.
Figure 22:
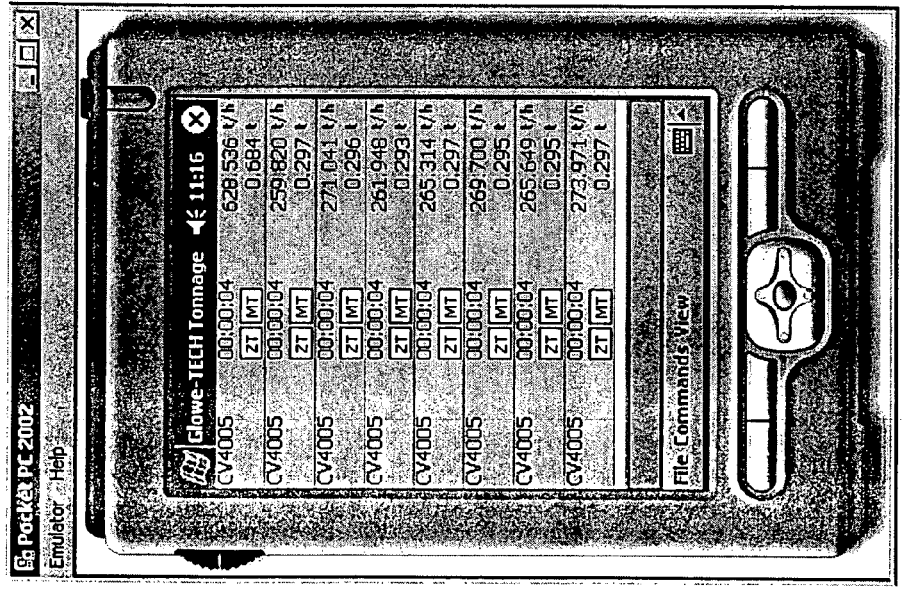
FIG. 22 the data is then converted to tonnage and displayed on the PDA for up to 8 channels of input data.

FIG. 21 illustrates the collection of all data from the watt transducers by an Analog data recorder which is hooked up to a pocket PC (PDA) which records the readings every second, runs the calculations and displays up to 8 channels of data on the same screen. The basic screen shows tph and total tonnes. FIG. 22 illustrates a second screen shot that shows time of production and No-load time. No-load tests similar to the Automat program may also be done and calculations readjusted automatically after a No-load test, FIGS. 23 and 24. There is also a feature to save data and run an average reading during a material test 'MT'. Finally FIG. 25 illustrates a typical daily summary table for the production time and tonnage for all channels operating. This setup is very compact yet has the capability to store over 1 month's data on a 64 meg memory card for up to 8 channels running at the same time. This is equivalent to 8 belt scale units all of which will be stored in a CEMA 4 case that is 12 in×8 in×6 in deep with a clear plastic cover so the operator can see readings during the day.

Figure 18:
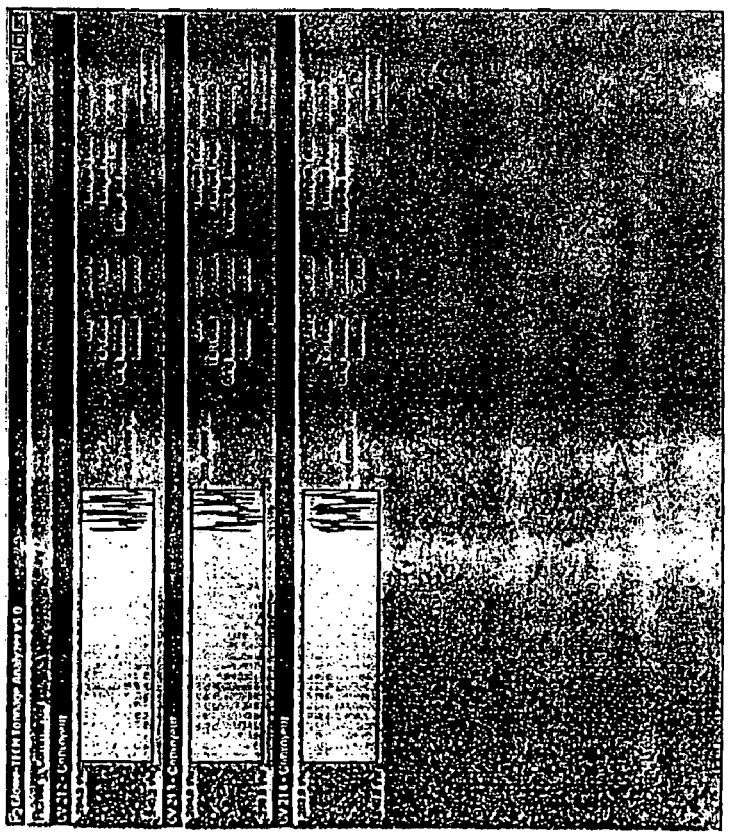
FIG. 18 is an example of the Real Time Program showing actual readings from the data logger being recorded and converted to tonnes/hour and total tonnage. Also included in this program is a No-Load test to re-check the No-Load setting for the conveyor or bucket elevator. A No-Load test was just run on channel 1 as indicated by the red lines. Note this screen shot is similar on a standard computer screen or on a Touch Screen Industrial PC.

FIG. 18 illustrates yet another embodiment which uses the ACR data logger as the source readings every 4 seconds. In this embodiment, the main figures such as tph and total tonnes moved as well as production time, No-load time and No-load original reading and the current reading being used since the last Zero test are all shown live. This embodiment also has the zero-test feature which is activated by the operator by simply touching the zero test key. The red numbering indicates the test has been activated and is terminated by simply touching the Zero test key once again. The new No-Load figure is displayed and is used in the calibration formula to do the conversion to tonnage. In yet another embodiment, the No-load test reading is applied not only for future readings but also retroactively to all readings taken since the start of the day. This allows the flexibility to do a Zero test latter in the day and have a choice to apply this figure to future readings or to all readings for the day. The actual computer display can be a standard screen or a Touch Screen Industrial PC such as an Advantech 12.1 inch TPC-1260TEX Touch screen or a BSI 12.1 inch RMS-1120 Touch screen.

The apparatus and methods of the present invention provide for a means of measuring the amount of material being processed or moved in an operation such as a quarrying or mining operation which is inexpensive, simple to setup and operate and to adapt to existing operations. The present invention also provides a means to determine how efficient the operation is running i.e. each step in a quarry, mine or sand and gravel operation is designed to move a certain quantity of material daily at an hourly rate. At some steps in the operation, downtime may occur and if a record is measured of this downtime or "No-load", then this becomes an area that can be improved to increase production. Utilizing the present invention, an operator can adjust the process to run at design production rates with minimum downtime to maximize production. This invention provides the measurement tools at a low cost to achieve this goal. In addition if measurements are made at the conveyors coming off the primary and secondary crushers and at some key conveyors going to final stockpiles then these measurements can be used as a new method to compare blasting results.

The invention described herein is based on a new method to calibrate the Glowe-Tech Tonnage Analyzer, which increases precision and includes new applications, which will help industry to become more productive.

Although various preferred embodiments of the present invention have been described herein in detail, it will be appreciated by those skilled in the art, that variations may be made thereto without departing from the spirit of the invention or the scope of the appended claims.

We claim:

1. An apparatus for measuring the weight of material being processed or moved by a material moving apparatus driven by an electrical motor, the apparatus comprising a means for measuring the electrical energy consumed by the motor driving the material moving apparatus during operation of the material moving apparatus and a calibration formula for converting the power consumption of the motor to tonnage per hour of raw material being processed by the apparatus, the calibration formula being derived from an average of "no-load" readings plus up to 2.0 standard deviations, wherein a continual record is kept of all "No-load" and "start-up load" time during the recording process and these figures are totalized along with tonnage for the recording period.

2. An apparatus according to claim 1 wherein the material moving apparatus is a conveyor, apron conveyor or bucket elevator.

3. An apparatus according to claim 2 wherein the apparatus is provided with a temperature sensor to monitor the ambient temperature and apply a temperature calibration factor to adjust the output of the apparatus based upon the ambient temperature.

4. An apparatus according to claim 3 wherein the apparatus is provided with a belt speed sensor to monitor the speed of the belt and adjust the output should stalling or slippage of the belt occur.

5. A method for measuring the weight of material being processed or moved by a material moving apparatus driven by an electrical motor, the method comprising measuring the electrical energy consumed by the motor driving the material moving apparatus during operation of the apparatus and utilizing a calibration formula to convert the amount of electrical energy consumed by the motor to tonnage per hour of raw material processed by the material moving apparatus, the calibration formula being derived from an average of "no-load" readings plus up to 2.0 standard deviations, wherein a continual record is kept of all "No-load" and "start-up load" time during the recording process and these figures are totalized along with tonnage for the recording period.

6. A method according to claim 5 wherein the material moving apparatus is a conveyor, apron conveyor or bucket elevator.

7. A method according to claim 6 wherein the apparatus is provided with a temperature sensor to monitor the ambient temperature and the method involves the further step of applying a temperature calibration factor to adjust the output of the apparatus based upon the ambient temperature.

8. A method according to claim 7 wherein the apparatus is provided with belt speed sensor to monitor the speed of the belt and the method involves the further step of adjusting the output of the apparatus should stalling or slippage of the belt occur.

9. A method according to claim 8 wherein the apparatus is provided with a digital inclinometer to monitor changes in angle on stacker conveyors to adjust the conversion of kilowatts to tonnage by using a factor from the tilt sensor showing any changes in angle as the conveyor moves up or down.

10. A method according to claim 9 wherein a No-load test provides a new No-Load figure which is compared to the original No-Load figure and any difference is added or subtracted from the original and this difference is applied to the regression formula to filter out mechanical changes that may develop from normal operating conditions of a conveyor, apron conveyor or bucket elevator.

11. A method according to claim 5 wherein the "start-up load" is set at a level just above a normal full production load reading which filters out large peaks occurring when an apparatus is started under full load, while recording a kilowatt reading during start up insuring all readings are used in the conversion process.

12. A method according to claim 10 wherein material tests carried out after initial calibration are conducted after a no-load test to insure that the new material test figure is calculated and adjusted to the difference in new no-load reading compared to the original test at a base no-load figure to insure all data is related back to the original test.

13. A method according to claim 12 wherein the No-load reading is calculated using the average idle kilowatt reading plus between 1.0 and 2.0 standard deviations depending on the slope of the regression line to insure all readings below the no-load, idle operating level are filtered out of the kilowatt conversion to tonnage to increase precision of readings.

14. A method according to claim 11 wherein the material moving apparatus includes a crusher operated by an electrical crusher motor and the kilowatt hour of power consumption of the crusher motor while the crusher is crushing rock is also measured and applied to a calibration formula to provide a measurement of tonnes of rock crushed per kilowatt hour of energy consumed to compare drilling and blasting results.

15. A method according to claim 14 wherein the material moving apparatus includes one or more screening apparatus to sieve the material according to particle size feeding a plurality of conveyors, the weight of material moved by each conveyor to a stockpile being measured to provide a sieve analysis of rock fragmentation produced by quarry blasting in real time.

16. A method according to claim 15 wherein tonnes of rock crushed per kilowatt hour are combined with the tonnes of rock measured by the material moving apparatus going into final stockpiles and used as a sieve analysis of rock fragmentation produced by quarry blasting to compare drilling and blasting results in real time.

* * * * *